United States Patent
Choi et al.

(10) Patent No.: US 12,293,455 B1
(45) Date of Patent: May 6, 2025

(54) METHOD AND SYSTEM FOR GENERATING DIGITAL TWIN CONTENT CORRESPONDING TO SPACE IN WHICH MOVEMENT OF OBJECT WITHIN SPACE IS ABLE TO BE TRACKED AND STATE OF OBJECT IS ABLE TO BE DETERMINED

(71) Applicant: CORNERS CO., LTD., Seoul (KR)

(72) Inventors: Jang Won Choi, Seoul (KR); Dong Oh Kim, Seoul (KR); Jihan Kim, Seoul (KR)

(73) Assignee: CORNERS CO., LTD., Seoul (KR)

( * ) Notice: Subject to any disclaimer, the term of this patent is extended or adjusted under 35 U.S.C. 154(b) by 0 days.

(21) Appl. No.: 18/821,534

(22) Filed: Aug. 30, 2024

(30) Foreign Application Priority Data

Mar. 15, 2024 (KR) .......................... 10-2024-0036634

(51) Int. Cl.
*G06T 17/00* (2006.01)
*G06T 7/20* (2017.01)
*G06T 15/20* (2011.01)

(52) U.S. Cl.
CPC ............... *G06T 17/00* (2013.01); *G06T 7/20* (2013.01); *G06T 15/20* (2013.01); *G06T 2207/30108* (2013.01); *G06T 2207/30232* (2013.01)

(58) Field of Classification Search
None
See application file for complete search history.

(56) References Cited

U.S. PATENT DOCUMENTS

| 2024/0112399 | A1* | 4/2024 | Ramani | G06V 40/28 |
| 2024/0420449 | A1* | 12/2024 | Kocamaz | G06V 10/761 |
| 2024/0428437 | A1* | 12/2024 | Gupta | G06V 20/70 |

FOREIGN PATENT DOCUMENTS

| KR | 10-2022-0030732 | 6/2022 |
| KR | 10-2023-0007422 | 1/2023 |
| KR | 10-2023-0013297 | 1/2023 |
| KR | 10-2567516 | 8/2023 |
| KR | 10-2023-0020745 | 4/2024 |

OTHER PUBLICATIONS

Korean Request for Submission of an Opinion mailed May 13, 2024, issued in corresponding Korean Application No. 10-2024-0036634, filed Mar. 15, 2024, 14 pages.
Korean Written Decision on Registration mailed Nov. 13, 2024, issued in corresponding Korean Application No. 10-2024-0036634, filed Mar. 15, 2024, 7 pages.

* cited by examiner

*Primary Examiner* — Frank S Chen
(74) *Attorney, Agent, or Firm* — Christensen O'Connor Johnson Kindness PLLC

(57) ABSTRACT

Disclosed is a method of generating digital twin content corresponding to a space including objects, such as a work site including work products. The method of generating digital twin content includes obtaining a three-dimensional (3-D) model of the space, disposing, in the 3-D model, a first virtual camera that is synchronized with a first camera that is disposed in the space and that captures at least some of the space, recognizing a object in a first image that is captured by the first camera, generating a 3-D object that is disposed in the 3-D model and that corresponds to the first object, based on the first object and the first virtual camera, and generating digital twin content including a 3-D object into which a movement of the first object is incorporated.

9 Claims, 20 Drawing Sheets

FIG. 8
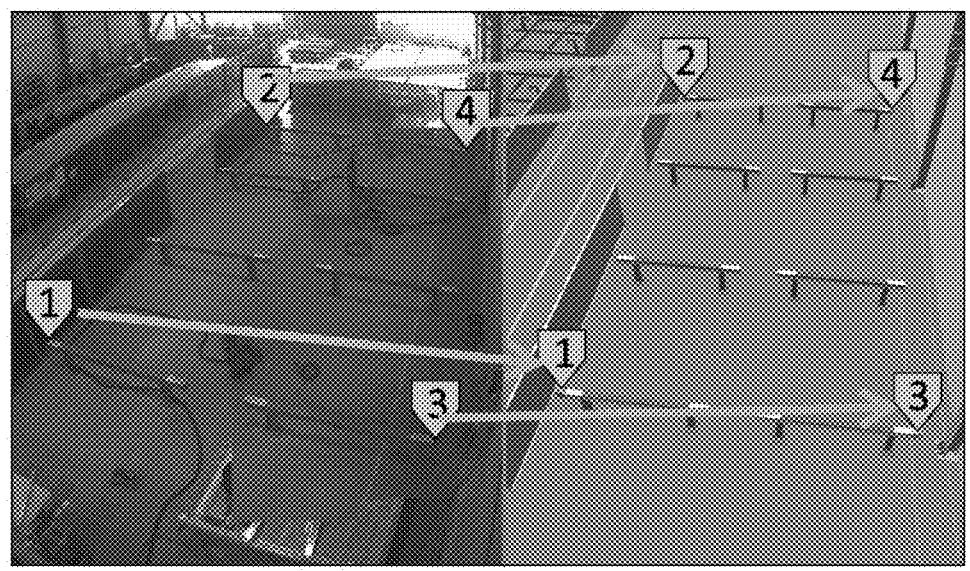
FIG. 9
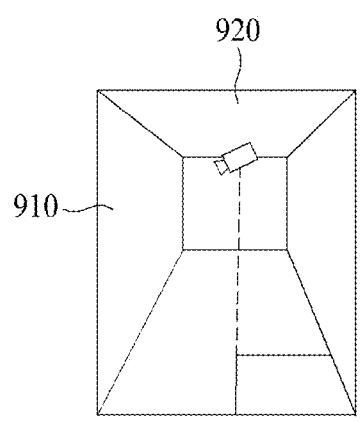 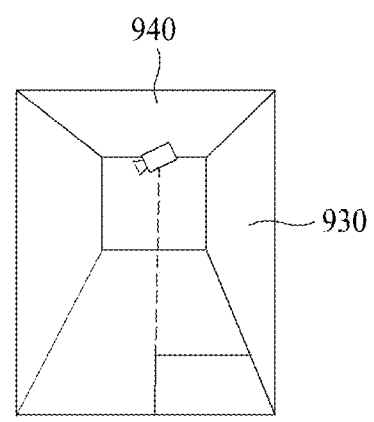
(a)          (b)

(a)  (b)

(a)　　　　　　　　　　(b)

METHOD AND SYSTEM FOR GENERATING DIGITAL TWIN CONTENT CORRESPONDING TO SPACE IN WHICH MOVEMENT OF OBJECT WITHIN SPACE IS ABLE TO BE TRACKED AND STATE OF OBJECT IS ABLE TO BE DETERMINED

CROSS-REFERENCE TO RELATED APPLICATION

This application is based on and claims priority under 35 U.S.C. 119 to Korean Patent Application No. 10-2024-0036634, filed on Mar. 15, 2024 in the Korean intellectual property office, the disclosures of which are herein incorporated by reference in their entireties.

TECHNICAL FIELD

Embodiments relate to a method and system for generating digital twin content corresponding to a space including objects, such as a work site including work products.

BACKGROUND OF THE DISCLOSURE

A digital twin means a technology in which various simulations can be performed by implementing an object that is the same as (or similar to) the real world in a virtual space. For example, digital twin content for the real world may be generated by three-dimensional (3-D) modeling a corresponding space corresponding to a space corresponding to the real world and disposing, in the corresponding space, an object disposed in the space by imitating the object as a corresponding object.

In a work site (e.g., a manufacturing plant) including work products, in order to monitor productivity or a work situation, it is necessary to estimate work products and to identify the state of the work products. In particular, if a work product is very large, or it is difficult to automate the work product like a heavy industry manufacturing plant, a worker has to check a work situation or productivity of a manufacturing plant by manually recording a processing situation for the work product. In this case, such a method is very inefficient, and there is a good possibility of error occurrence.

Accordingly, there is a need for a method of generating digital twin content corresponding to a work site so that objects within a work site can be individually tracked and the state of each object can be accurately identified.

Korean Patent Application Publication No. 10-2023-0020745 relates to an apparatus for evaluating apparatus performance and discloses an apparatus for evaluating apparatus performance using a digital twin technology.

The aforementioned information is to merely help understanding, and may include contents which do not form a part of a conventional technology.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An embodiment may provide a method of generating digital twin content, including obtaining a three-dimensional (3-D) model of the space, disposing, in the 3-D model, a first virtual camera that is synchronized with a first camera that is disposed in the space and that captures (or photographs) at least some of the space, recognizing at least one first object in a first image that is captured by the first camera, generating a 3-D object that is disposed in the 3-D model and that corresponds to the first object, based on the first object and the first virtual camera, and generating digital twin content including a 3-D object into which a movement of the first object is incorporated.

In an aspect, there is provided a method of generating digital twin content corresponding to a space including objects, which is performed by a computer system and includes obtaining a three-dimensional (3-D) model of the space, disposing, in the 3-D model, a first virtual camera that is synchronized with a first camera that is disposed in the space and that captures at least some of the space, recognizing at least one first object in a first image that is captured by the first camera, generating a 3-D object that is disposed in the 3-D model and that corresponds to the first object, based on the first object and the first virtual camera, and generating digital twin content corresponding to at least one of the space including a 3-D object into which a movement of the first object in the first image is incorporated and the first image.

The first camera may be plural. The disposing of the first virtual camera may include disposing, in the 3-D model, a plurality of first virtual cameras that is synchronized with a plurality of first cameras, respectively. The recognizing of the at least one first object may include recognizing the first object in the first image that is captured by each of the first cameras. The generating of the digital twin content may include generating partial digital twin content corresponding to each of the first images in association with each of the first virtual cameras, wherein the partial digital twin content includes a 3-D object into which the movement of the first object recognized in each of the first images within each of the first images is incorporated, and generating the entire digital twin content corresponding to the space, wherein the entire digital twin content includes a 3-D object into which the movement of the first object within the space is incorporated.

The method of generating digital twin content may further include recognizing at least one second object in the first image and identifying a region corresponding to the second object in the 3-D model. The first object may be a moving work product within the space. The second object may indicate a standby region in which the work product stands by. The generating of the digital twin content may include tracking a movement of the 3-D object into which a movement of the work product is incorporated, and identifying any one state of whether the 3-D object enters the region corresponding to the second object, whether the 3-D object is placed in the region corresponding to the second object, and whether the 3-D object falls outside from the region corresponding to the second object.

The generating of the digital twin content may further include identifying whether the work product or the 3-D object in the region corresponding to the second object is stacked in the digital twin content, based on the identified state.

The recognizing of the first object may include recognizing the first object in the first image based on an instance segmentation algorithm. The generating of the 3-D object may include extracting a predetermined number of feature points from a figure indicative of a shape of the first object recognized in the first image, generating a polygon corresponding to the first object recognized in the first image, based on the feature points, generating a basic figure corresponding to the first object recognized in the first image by approximating the polygon, and generating the 3-D object based on the basic figure.

The generating of the 3-D object may include obtaining information on a size and location of a first two-dimensional (2-D) figure corresponding to the recognized first object, determining a location in the 3-D model onto which a second 2-D figure is to be projected, in an identical size at an identical location that is indicated by the information on the size and location, through the first virtual camera synchronized with the first camera, and generating the 3-D object based on the determined location.

The generating of the digital twin content may include in tracking a movement of the 3-D object into which the movement of the first object is incorporated, comparing a first region of a 3-D object corresponding to the first object within the digital twin content corresponding to a first time or first frame of the first image, with a second region of the first object within the first image of a second time after the first time or a second frame next to the first frame, and tracking the movement of the 3-D object into which the movement of the first object is incorporated, by determining the movement of the first object from the first time to the second time or from the first frame to the second frame based on results of the comparison.

The generating of the digital twin content may include comparing pieces of partial digital twin content associated with the plurality of first virtual cameras, and identifying a region in which first partial digital twin content and second partial digital twin content, among the pieces of partial digital twin content, are matched with each other, and identifying, as an identical 3-D object, a 3-D object that is included in the region in which the first partial digital twin content and the second partial digital twin content are matched with each other.

The generating of the digital twin content may include suspending data processing for another 3-D object that overlaps the 3-D object within the digital twin content until the overlap with the 3-D object is solved, while the 3-D object moves, by incorporating the movement of the first object.

The method of generating digital twin content may further include rendering the partial digital twin content and the entire digital twin content in order to display the partial digital twin content and the entire digital twin content on a user terminal. The partial digital twin content and the entire digital twin content may be associated and displayed on the user terminal. At least one of i) that a 3-D object is differently displayed for each object, ii) that a moving 3-D object is displayed differently from another 3-D object that has been stopped, iii) that a 3-D object that overlaps a moving 3-D object is displayed differently from remaining 3-D objects, iv) that the partial digital twin content is differently displayed for each first virtual camera, and v) that an indicator indicative of the first virtual camera or the partial digital twin content, among pieces of partial digital twin content associated with a plurality of first virtual cameras, which is used to track a moving 3-D object, is displayed in the moving 3-D object, may be performed in at least one of the partial digital twin content and the entire digital twin content.

According to an embodiment, it is possible to generate digital twin content which enables an object within a space to be accurately identified and tracked and also the state of the object to be identified by using a virtual camera that is synchronized with a camera provided within the space so that the location and view angle of the virtual camera are matched with those of the camera.

According to an embodiment, in a factory indicating a work environment in which a work product is specially large like a heavy industry manufacturing plant, it is possible to accurately identify and track an object corresponding to the work product and to identify the state of the work product, such as a movement, stop, and stack of the work product.

According to an embodiment, in recognizing an object in an image in order to generate a three-dimensional (3-D) object for digital twin content, the influence of interference and covering between objects can be minimized and resolution for recognizing an object can be improved by using the instance segmentation algorithm.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 8 illustrates a method of disposing, in the 3-D model of a space, a virtual camera that is synchronized with a camera disposed in the space, according to an example.

FIGS. 9 to 13 illustrate a method of synchronizing a camera disposed in a space and a virtual camera disposed in a 3-D model, according to an example.

DETAILED DESCRIPTION

Figure 1:
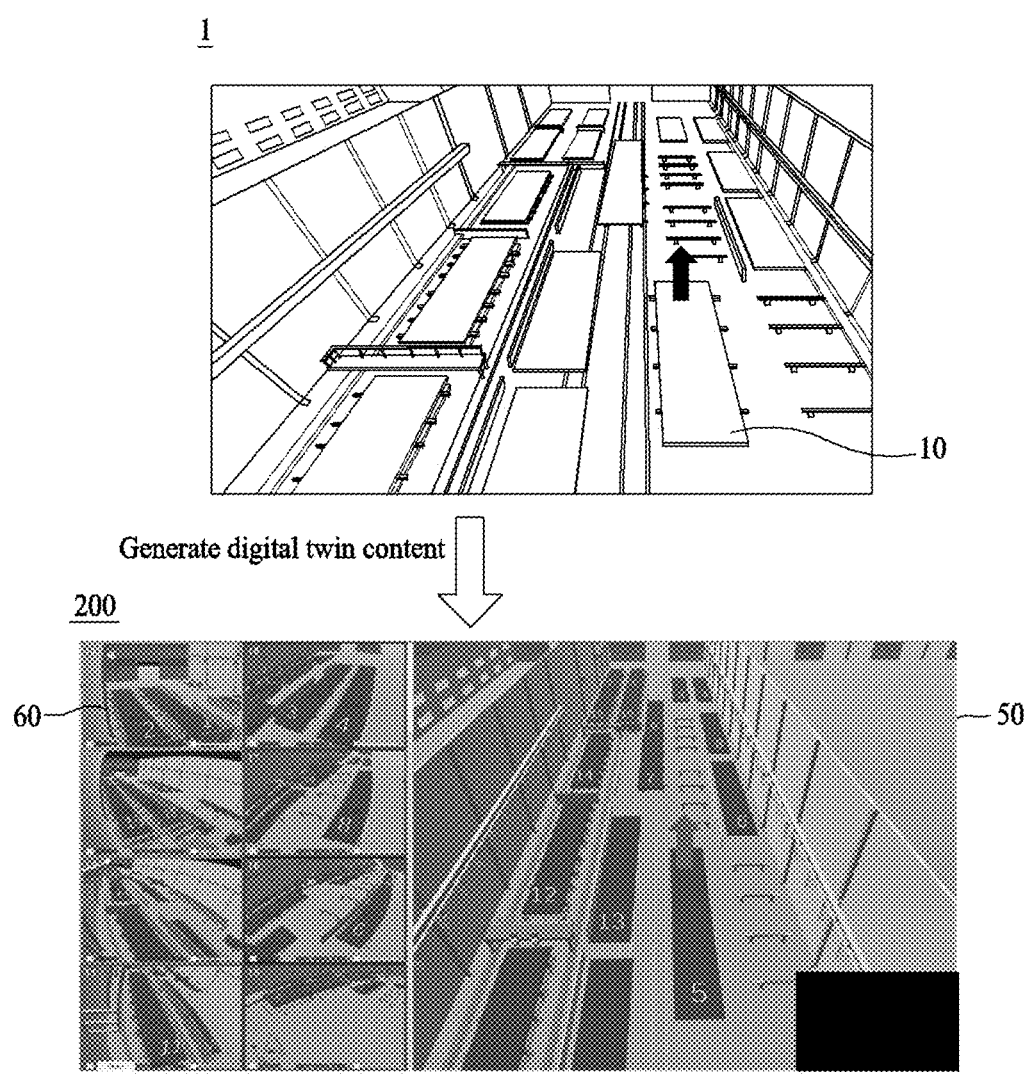
FIG. 1 illustrates a method of generating digital twin content corresponding to a space including objects, according to an embodiment.

While illustrative embodiments have been illustrated and described, it will be appreciated that various changes can be made therein without departing from the spirit and scope of the disclosure.

Hereinafter, embodiments are described in detail with reference to the accompanying drawings. The same reference numeral that is presented in each drawing denotes the same member.

FIG. 1 illustrates a method of generating digital twin content corresponding to a space including objects, according to an embodiment.

A method of generating digital twin content 200 corresponding to a space 1 including objects illustrated in FIG. 1 is described with reference to FIG. 1.

The space 1 is a space that is present in the real world, and may be a work site, such as a factory, or a part thereof, for example. The space 1 may be a unit section for generating the digital twin content 200. As illustrated, the space 1 may include a plurality of objects. Each of the objects may be a work product that is used in a work space. For example, each of the objects may be a product that is produced in a factory, an intermediate product of the product, a machine apparatus that is used to produce the product, a part of a corresponding machine apparatus, or a region in which the product or the intermediate product is disposed. In an embodiment, at least one of the objects may be moved according to the progress of work in the space 1. In FIG. 1, such a moving object is indicated as a first object 10. The first object 10 may be moved in order to perform a process within the space 1, for example. However, in embodiments to be described hereinafter, the first object 10 may include an arbitrary object within the space 1, in addition to a moving object.

At least one camera may be disposed in the space 1. The camera may photograph at least some of the space 1. The camera may be a surveillance camera or CCTV. The camera may be installed for security or work monitoring within the space 1. The space 1 may also illustrate an image that is captured by the camera disposed in the space 1.

In an embodiment, the digital twin content 200 corresponding to the space 1 may be generated based on an image of the space 1, which is captured by a camera disposed in the space 1.

The digital twin content 200 may be generated based on a three-dimensional (3-D) model of the space 1 and the image of the space 1. The 3-D model may be previously generated as a 3-D model that is matched with the layout of the space 1. For example, the 3-D model is a model that is generated by modeling the space 1 in a 3-D way, and may be a 3-D map of the space 1. Alternatively, the 3-D model may be generated based on an image(s) that is captured by a camera(s) disposed in the space 1.

As illustrated, 3-D objects corresponding to objects included in the space 1 may be represented in the digital twin content 200. Furthermore, the digital twin content 200 may include a first 3-D object 55 into which a movement of the first object 10 is incorporated. That is, the first 3-D object 55 may be represented within the digital twin content 200 so that the first 3-D object is moved in response to a movement of the first object 10.

The digital twin content 200 may be generated by a computer system 100 to be described later with reference to FIG. 2.

The digital twin content 200 imitates the space 1, and may represent the objects that are present within the space 1 as 3-D objects. In other words, the digital twin content 200 may represent a movement and arrangement of objects within the space 1 as a movement and arrangement of corresponding 3-D objects. The digital twin content 200 is obtained by modeling the space 1 in a 3-D way, compared to a 2-D image, that is, an image that is captured by a camera, and may indicate a situation, a work flow, a movement of object, and the state of objects in the real space 1 more accurately, compared to an image that is captured by a camera.

In an embodiment, a virtual camera that is synchronized with a camera disposed in the space 1 may be disposed in a 3-D model of the space 1. In other words, the virtual camera may be disposed in the 3-D model so that the virtual camera has the same view angle as the camera disposed in the space 1 at the same location as the location where the camera is disposed in the space 1. The virtual camera may be configured to move or to have the view angle changed, in conjunction with a movement of the camera or a change in the view angle of the camera. In the illustrated example, a total of eight cameras are installed in the space 1. Accordingly, a total of eight virtual cameras are disposed in the 3-D model. For example, cameras 11 to 14 may be disposed on a left wall of the space 1, and cameras 15 to 18 may be disposed on a right wall of the space 1. Virtual cameras 11 to 14 and virtual cameras 15 to 18 that are synchronized with the cameras 11 to 14 and the cameras 15 to 18 may be disposed in the 3-D model. 3-D objects (e.g., the first 3-D object 55) that are matched with objects (e.g., the first object 10) more accurately may be generated by using the virtual camera that is synchronized with the camera disposed in the space 1.

For example, the computer system 100 may recognize the first object 10 in an image from a camera, and may generate the first 3-D object 55 that corresponds to the first object 10 and that is disposed in the 3-D model of the space 1, based on the recognized first object 10 and a virtual camera that is synchronized with the camera. Accordingly, the computer system 100 may generate the digital twin content 200 including the first 3-D object 55 into which a movement of the first object 10 is incorporated.

As illustrated, the digital twin content 200 may include partial digital twin content 60 and the entire digital twin content 50. In this case, each piece of partial digital twin content 60 may be digital twin content corresponding to an image that is captured by a specific camera (i.e., any one of the cameras 11 to 18). That is, each piece of partial digital twin content 60 may indicate 3-D objects that are projected by a specific virtual camera and a 3-D model of the space 1. The entire digital twin content 50 may indicate 3-D objects and a 3-D model corresponding to the entire space 1. The entire digital twin content 50 may be generated based on pieces of partial digital twin content (i.e., pieces of partial digital twin content associated with the virtual cameras 11 to 18).

As illustrated, in an embodiment, objects within the space 1 can be tracked more accurately and effectively because virtual cameras synchronized with cameras that are disposed in the space 1 are disposed in the 3-D model and the digital twin content 200 corresponding to the space 1 is generated. Furthermore, partial digital twin content corresponding to (by each virtual camera) an image that is captured by each camera within the space 1 may be generated.

The digital twin content 200 may be used to monitor productivity or a work situation within a work site by tracking objects within the space 1, that is, work products disposed in the work site, and may also be used in various simulations for the space 1.

Figure 20:
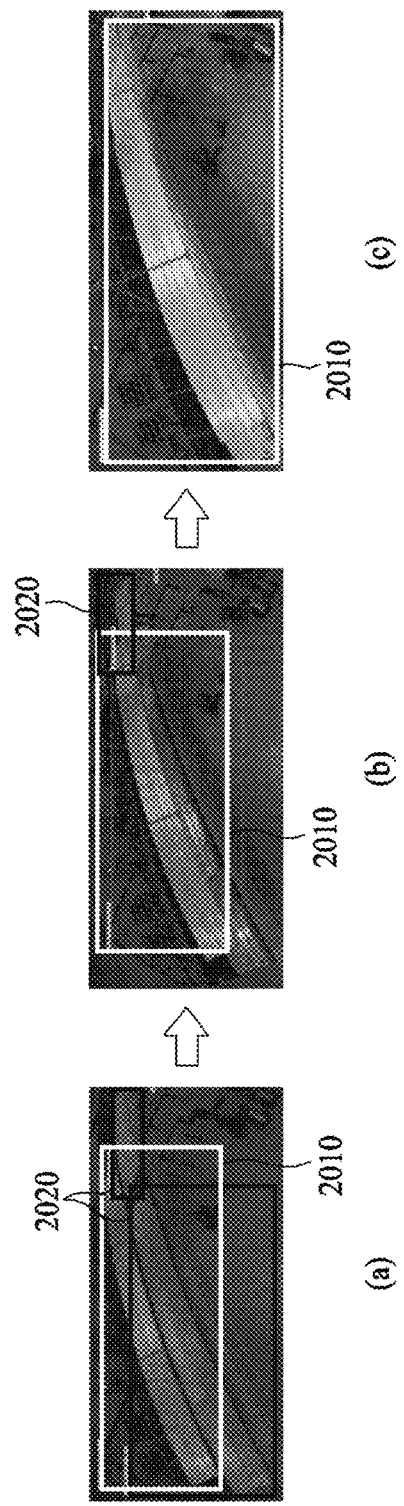
FIG. 20 illustrates a method of locking another 3-D object that overlaps a 3-D object when the 3-D object moves within digital twin content, according to an example.
Figure 21:
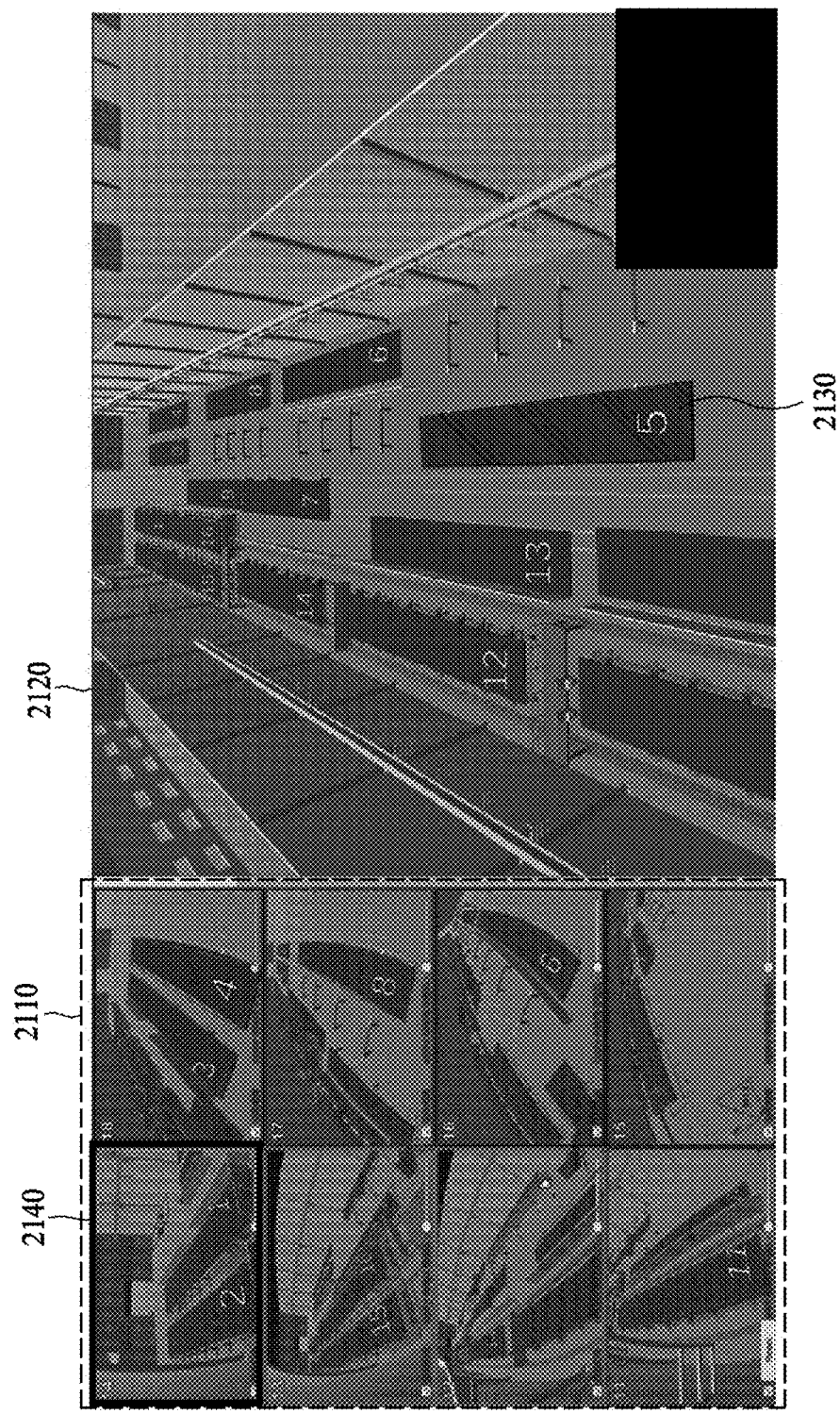
FIG. 21 illustrates a method of displaying, on a user or manager terminal, a plurality of pieces of partial digital twin content and the entire digital twin content by rendering the plurality of pieces of partial digital twin content and the entire digital twin content, according to an example.

A more detailed example of the digital twin content 200 is described more specifically with reference to FIG. 21. A more detailed method for generating the digital twin content 200 is described more specifically with reference to FIGS. 3 to 21.

Figure 2:
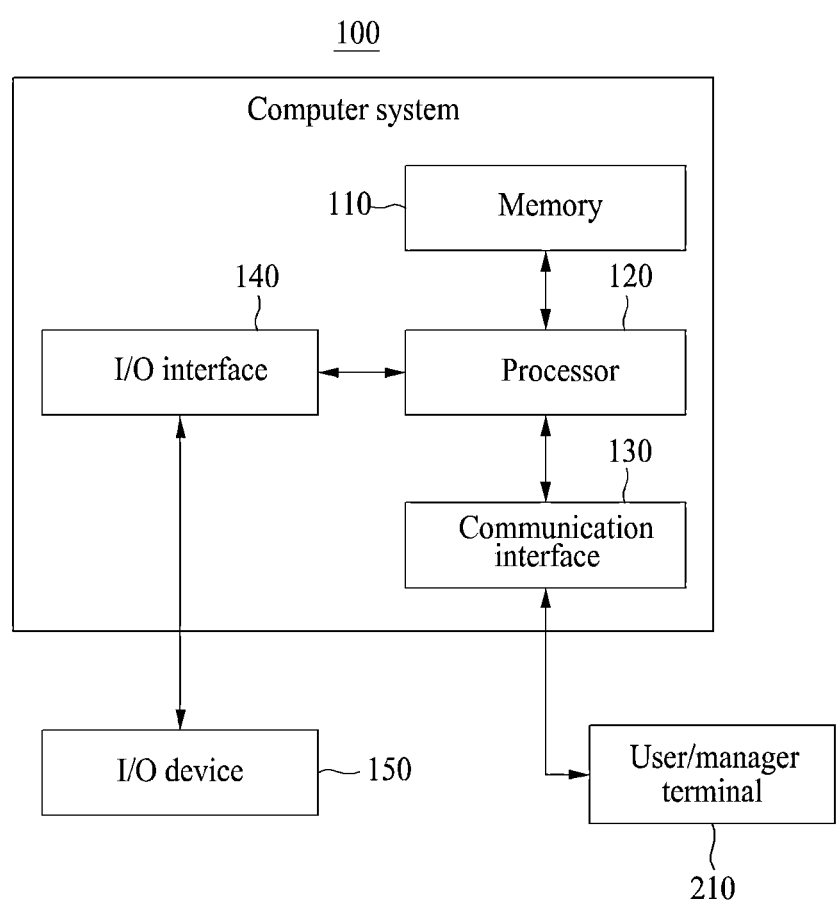
FIG. 2 is a block diagram illustrating a computer system that generates digital twin content corresponding to a space including objects, according to an embodiment.

FIG. 2 is a block diagram illustrating a computer system that generates digital twin content corresponding to a space including objects, according to an embodiment.

That is, the computer system 100 may be an electronic device that generates the digital twin content 200 corresponding to the space 1. For example, a computer program for implementing a method of generating the digital twin content 200 according to an embodiment may be installed and driven in the computer system 100. The computer system 100 may perform the method of generating the digital twin content 200 according to embodiments under the control of the driven computer program.

The computer system 100 may be a computer device capable of installing and executing an application or program for performing the method of generating the digital twin content 200, as an electronic device. Furthermore, the computer system 100 may be a personal computer (PC), a laptop computer, a laptop computer, a tablet, an Internet of things (IoT) device, or a wearable computer. Alternatively, the computer system 100 may be a user/manager terminal as a server or a cloud server or a computer device that communicates with the server or the cloud server. As illustrated, the computer system 100 may be a server or a cloud server. The computer system 100 may be configured to communicate with a user/manager terminal 210. The user/manager terminal 210 may be an apparatus on which the digital twin content 200 that has been rendered is displayed.

As illustrated, the computer system 100 may include memory 110, a processor 120, a communication interface 130, and an input and output interface 140 as components.

The memory 110 is a computer-readable recording medium, and may include random access memory (RAM), read only memory (ROM), and permanent mass storage devices, such as a disk drive. In this case, ROM and permanent mass storage devices, such as a disk drive, is a separate permanent storage device that is different from the memory 110, and may be included in the computer system 100. Furthermore, an operating system and at least one program code may be stored in the memory 110. Such software components may be loaded from a computer-readable recording medium that is different from the memory 110 onto the memory 110. Such a separate computer-readable recording medium may include computer-readable recording media, such as a floppy drive, a disk, a tape, a DVD/CD-ROM drive, and a memory card. In another embodiment, the software components may be loaded onto the memory 110 through the communication interface 130 not a computer-readable recording medium. For example, the software components may be loaded onto the memory 110 of the computer system 100 based on a computer program that is installed by files that are received over a network.

The processor 120 may be configured to process an instruction of a computer program by performing basic arithmetic, logic, and input/output (I/O) operations. The instructions may be provided to the processor 120 by the memory 110 or the communication interface 130. For example, the processor 120 may be configured to execute received instructions based on a program code that has been stored in a recording device, such as the memory 110.

That is, the processor 120 may manage components of the computer system 100, and may execute a program or an application that is used by the computer system 100. For example, the processor 120 may be configured to execute an application for performing steps of a method of generating the digital twin content 200 according to an embodiment and to process an operation and data for generating the digital twin content 200. Furthermore, the processor 120 may process an operation that is necessary for the execution of a program or an application and the processing of data, and may be at least one processor (e.g., a CPU and/or a GPU) of the computer system 100 or at least one core within the processor.

The communication interface 130 may provide a function for enabling the computer system 100 to communicate with another computer system over a network. For example, a request, an instruction, data, or a file that is generated by the processor 120 of the computer system 100 based on a program code that has been stored in a recording device, such as the memory 110, may be transferred to another computer system over the network under the control of the communication interface 130. Inversely, a signal, an instruction, data, or a file from another computer system may be received by the computer system 100 through the communication interface 130 of the computer system 100 over the network. A signal, an instruction, a file that is received through the communication interface 130 may be transmitted to the processor 120 or the memory 110. A file that is received through the communication interface 130 may be stored in a storage medium (e.g., the aforementioned permanent storage device) which may be further included in the computer system 100. For example, the communication interface 130 may be a hardware module, such as a network interface card, network interface chip, and networking interface port of the computer system 100, or a software module, such as a network device driver or a networking program.

The input and output interface 140 may be means for an interface with an input and output device 150. For example, the input device may include a device, such as a microphone, a keyboard, or a mouse. The output device may include a device, such as a display or a speaker. Furthermore, for example, the input and output interface 140 may be means for an interface with a device in which functions for an input and an output have been integrated into one, such as a touch screen. The input and output device 150, together with the computer system 100, may be configured as a single device.

Furthermore, in other embodiments, the computer system 100 may include components greater or smaller than the components of FIG. 2. However, it is not necessary to clearly illustrate most of conventional components. For example, the computer system 100 may be implemented to include at least some of the input and output devices that are connected to the I/O interface 140 or may further include other components, such as a transceiver, a global positioning system (GPS) module, a camera, various sensors, and a database.

The user/manager terminal 210 may be a device on which the digital twin content 200 that has been rendered is displayed. The user/manager terminal 210 may include components similar to those of the computer system 100, and a redundant description of those components is omitted. The user/manager terminal 210 may be a terminal that is used by a user/manager who uses and manages the digital twin content 200. The user/manager terminal 210 may include a PC, a laptop computer, a smartphone, a tablet, an Internet of things (IoT) device, or a wearable computer, for example, as a computing device.

Digital twin content that is illustrated in figures (e.g., FIG. 21) to be described later may be rendered and displayed in the user/manager terminal 210.

In a detailed description to be given later, embodiments are described on the basis of the computer system 100 corresponding to a server, for convenience of description. Furthermore, in the detailed description to be given later, operations that are performed by a component (e.g., the processor 120) of the computer system 100 may be described as being performed by the computer system 100, for convenience of description.

The description of the aforementioned technical characteristics described above with reference to FIG. 1 may also be applied to FIG. 2 without any change, and thus a redundant description thereof is omitted.

A method of generating the digital twin content 200 corresponding to the space 1 including a plurality of objects is described with reference to FIG. 3.

In step 310, first, the computer system 100 may obtain the 3-D model of the space 1 for generating the digital twin content 200. The 3-D model may be a model that is generated by modeling a work site corresponding to the space 1 in a 3-D way. The 3-D model may be previously generated as a 3-D model that is matched with the layout of the space 1. For example, the 3-D model is a model that is generated by modeling the space 1 in a 3-D way, and may be a 3-D map for the space 1. Alternatively, the 3-D model may be generated based on an image(s) that is captured by a camera(s) disposed in the space 1. Each of objects within the space 1 may be a work product that is used in a work space. For example, each of the objects may be a product that is produced in a factory, an intermediate product of the product, a machine apparatus that is used to produce the product, a part of a corresponding machine apparatus, or a region in which the product or the intermediate product is disposed.

In step 320, the computer system 100 may dispose, in the 3-D model, a first virtual camera that is synchronized with a first camera that is disposed in the space 1 and that captures at least some of the space 1. In this case, the "synchronization" may mean that the first virtual camera is disposed in the 3-D model so that the first virtual camera has the same view angle as the first camera at the same location as that where the first camera is disposed in the space 1. Furthermore, the first virtual camera that has been synchronized may be configured to move or to have a view angle changed in conjunction with a movement of the first camera or a change in the view angle of the first camera. A plurality of first cameras may be disposed in the space 1. Accordingly, a plurality of first virtual cameras may be disposed in the 3-D model.

The first camera may be disposed within the space 1 so that the first camera captures at least some of the space 1. The first camera may be disposed in the ceiling and/or on the wall side of the space 1, and may be configured to monitor a work situation of a work site or objects therein. An image of at least some of the space 1, which is captured by the first camera, may be named a first image.

In step 330, the computer system 100 may recognize at least one first object 10 in the first image that is captured by the first camera. For example, the computer system 100 may individually recognize all of objects within the space 1. Furthermore, according to an embodiment, the computer system 100 may recognize an object that is moving within the space 1.

The first object 10 may indicate an arbitrary object or at least one of objects within the space 1.

The computer system 100 may use an image analysis algorithm based on artificial intelligence (AI), for example, in order to recognize the first object 10 in the first image. The computer system 100 may individually recognize the objects within the first image by using the image analysis algorithm. The image analysis algorithm may be an instance segmentation algorithm, for example. As the instance segmentation algorithm is used, an error according to a proximity, interference and/or covering situation between objects can be reduced and resolution in the recognition of an object can be improved, compared to a case in which an object is recognized within an image by using a bounding box. Furthermore, in an embodiment, as the instance segmentation algorithm is used, an individual object can be tracked, and thus the state of the individual object can be easily identified.

In step 340, the computer system 100 may generate the 3-D object 55 corresponding to the first object 10 recognized in step 330, as a 3-D object for the digital twin content 200. In this case, the computer system 100 may generate the 3-D object 55 that corresponds to the first object 10 and that is disposed in the 3-D model, based on the recognized first object 10 and the first virtual camera. In an embodiment, the 3-D object 55 into which a real shape and movement of the first object 10 are more accurately incorporated may be generated, by generating the 3-D object 55 that will be disposed in the 3-D model and that corresponds to the object 10 by using the first virtual camera having a location and a view angle synchronized with those of the first camera. That is, the 3-D object 55 that is generated by using the first virtual camera synchronized with the first camera may accurately correspond to the first object 10 of the first image that is captured by the first camera. The 3-D object 55 may be a 3-D object that is required to project a 2-D object having the same location and size as the first object 10 indicated in the first image by using the first virtual camera. In other words, the 3-D object 55 may be a 3-D object to be disposed in the 3-D model, in order to indicate the same object as the first object 10 in a first virtual image of the 3-D model, which is captured by using the first virtual camera.

A method of disposing the first virtual camera synchronized with the first camera in the 3-D model is described more specifically with reference to FIGS. 8 to 14.

Figure 5:
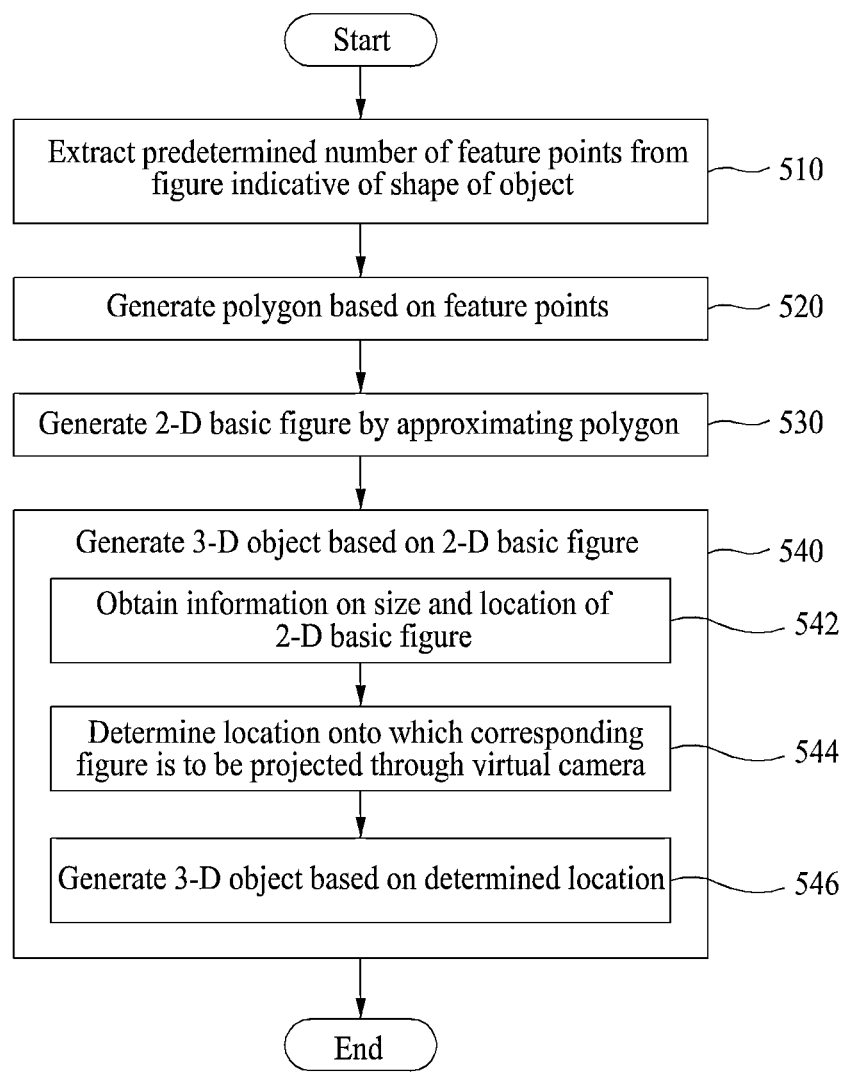
FIG. 5 is a flowchart illustrating a method of generating a 3-D object based on an object that is recognized in an image of a space, according to an example.
Figure 16:
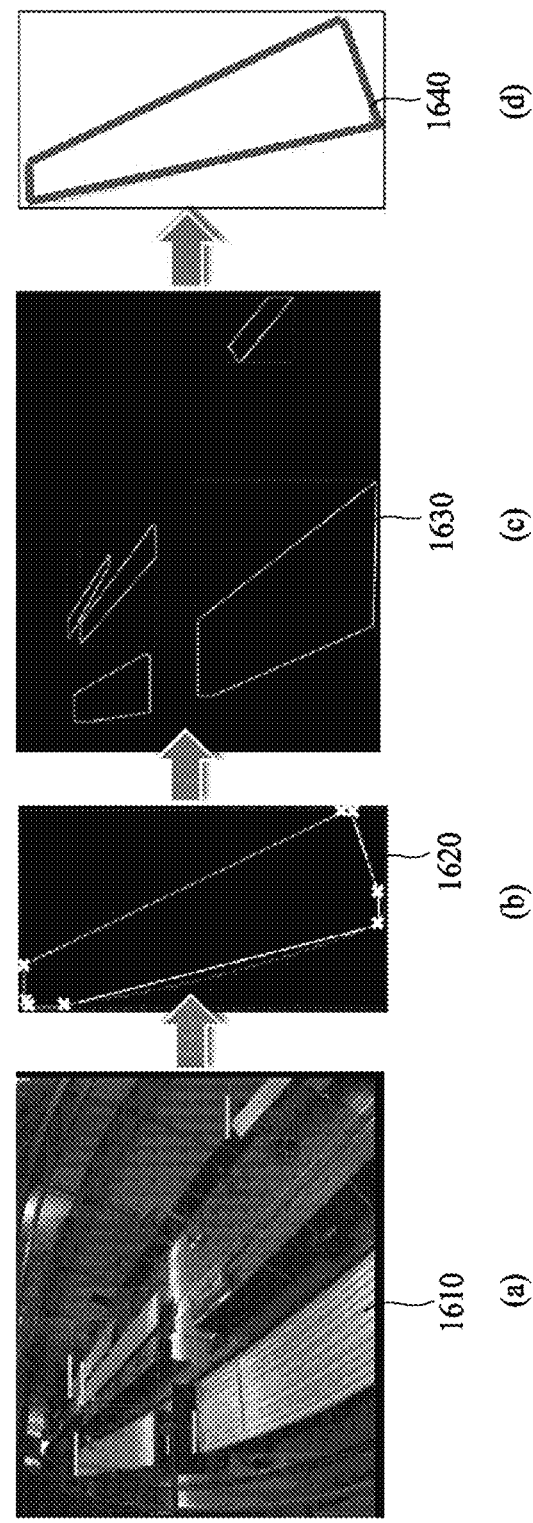
FIGS. 16 and 17 illustrate a method of generating a 3-D object based on an object that is recognized in an image of a space, according to an example.
Figure 17:
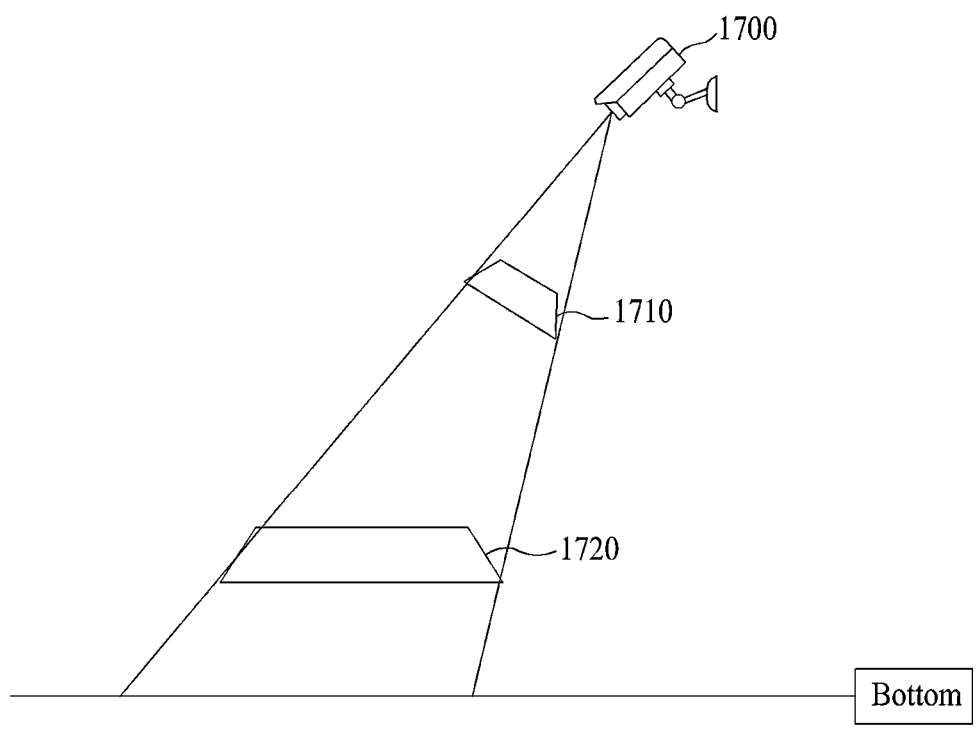

A more detailed method of generating the 3-D object corresponding to the first object 10 is described more specifically with reference to FIGS. 5, 16, and 17.

In step 350, the computer system 100 may generate the digital twin content 200 corresponding to the space 1 and/or the first image as the digital twin content 200 including a 3-D object (e.g., the 3-D object 55 generated in step 340) into which a movement of the first object in the first image 10 is incorporated.

For example, as illustrated in FIG. 1, the computer system 100 may generate the partial digital twin content 60 corresponding to the first image. Alternatively/additionally, the computer system 100 may generate the entire digital twin content 50 corresponding to the space 1. Alternatively/additionally, the computer system 100 may generate the digital twin content 200 including the partial digital twin content 60 and the entire digital twin content 50.

In the generated digital twin content 200, the movement of the first object 10 may be represented as a movement of the 3-D object 55. Furthermore, in the digital twin content 200, 3-D objects corresponding to (all of) objects that are recognized in the first image(s) may be represented. Accordingly, the digital twin content 200 may accurately indicate a work situation of the space 1 corresponding to a work site substantially in real time.

Hereinafter, an embodiment in the case in which the number of cameras disposed within the space 1 is plural, that is, the number of first cameras is plural, is described more specifically.

In this case, in step 310, the computer system 100 may dispose, in the 3-D model, a plurality of first virtual cameras that is synchronized with the plurality of first cameras, respectively. Accordingly, the plurality of first virtual cameras is synchronized with the plurality of first cameras, and may be disposed in the 3-D model at the same locations and same view angles as the plurality of first cameras. Furthermore, in step 330, the computer system 100 may recognize the first object in each first image that is captured by each first camera. That is, the computer system 100 may recognize an object(s) in the first image that is captured by the first camera. Furthermore, in step 340, the computer system 100 may generate a 3-D object corresponding to an object(s) that is recognized in each first image (by using a plurality of first virtual cameras). Furthermore, in generating the digital twin content 200, the computer system 100 may generate the partial digital twin content 60 corresponding to each first image in association with each first virtual camera in step 352. In this case, the partial digital twin content 60 may include the 3-D object 55 into which a movement of the first object 10, which is recognized in each first image, in each first image is incorporated. In other words, the computer system 100 may generate the partial digital twin content 60 in accordance with each of all of the first images. Accordingly, digital twin content corresponding to an image that is captured by each first camera may be generated. Furthermore, in generating the digital twin content 200, in step 354, the computer system 100 may generate the entire digital twin content 50 corresponding to the space 1. In this case, the entire digital twin content 50 may include the 3-D object 55 into which a movement of the first object 10 within the space 1 is incorporated. The computer system 100 may generate the entire digital twin content 50, based on the 3-D model of the space 1 and the partial digital twin content 60 generated in step 352. The entire digital twin content 50 may represent a movement and/or state of the first object 10 in the entire space 1. For example, as a specific 3-D object is moved, the movement of the specific 3-D object may be always indicated in the entire digital twin content 50 although the specific 3-D object is no longer indicated in any partial digital twin content 60.

In step 360, the computer system 100 may render the digital twin content 200 for a display on the user/manager terminal 210. For example, the computer system 100 may render the partial digital twin content 60 and the entire digital twin content 50 for a display on the user/manager terminal 210. A more detailed example of the digital twin content 200 that is rendered and displayed on the user/manager terminal 210 is described more specifically with reference to FIG. 21.

Hereinafter, a method of identifying the state of an object (or a 3-D object corresponding to the object) is described more specifically with reference to steps 335 and 345 described with reference to FIG. 3.

As described above, objects within the space 1 may be work products within the space 1. The first object 10 may be a work product that is moving within the space 1. The space 1 may include a standby region in which work products move and stand by. The standby region may indicate a space in which a work product is temporarily loaded or stored. The standby region is a region that is previously designated within the space 1, and may be previously designated even within a 3-D model. An embodiment is described by naming the standby region as a second object.

In step 335, the computer system 100 may recognize at least one second object (e.g., the standby region) in the first image of the space 1.

In step 345, the computer system 100 may identify a region corresponding to the second object within the 3-D model. A region in the 3-D model corresponding to the second object, that is, the standby region, may be previously designated in the 3-D model. The computer system 100 may identify a region corresponding to the standby region that has been previously designated.

In an embodiment, the computer system 100 may identify the state of the first object 10 (or the 3-D object 55 corresponding to the first object 10), that is, a work product, based on at least one of the entry of the 3-D object 55 corresponding to the first object 10 into a region corresponding to the second object, a stay in the region corresponding to the second object, and an exit from the region corresponding to the second object, by tracking the 3-D object 55 corresponding to the first object 10, that is, a work product.

A detailed method of tracking the 3-D object 55 and identifying the state thereof is described more specifically below with reference to FIGS. 4, 15, and 18.

Figure 3:
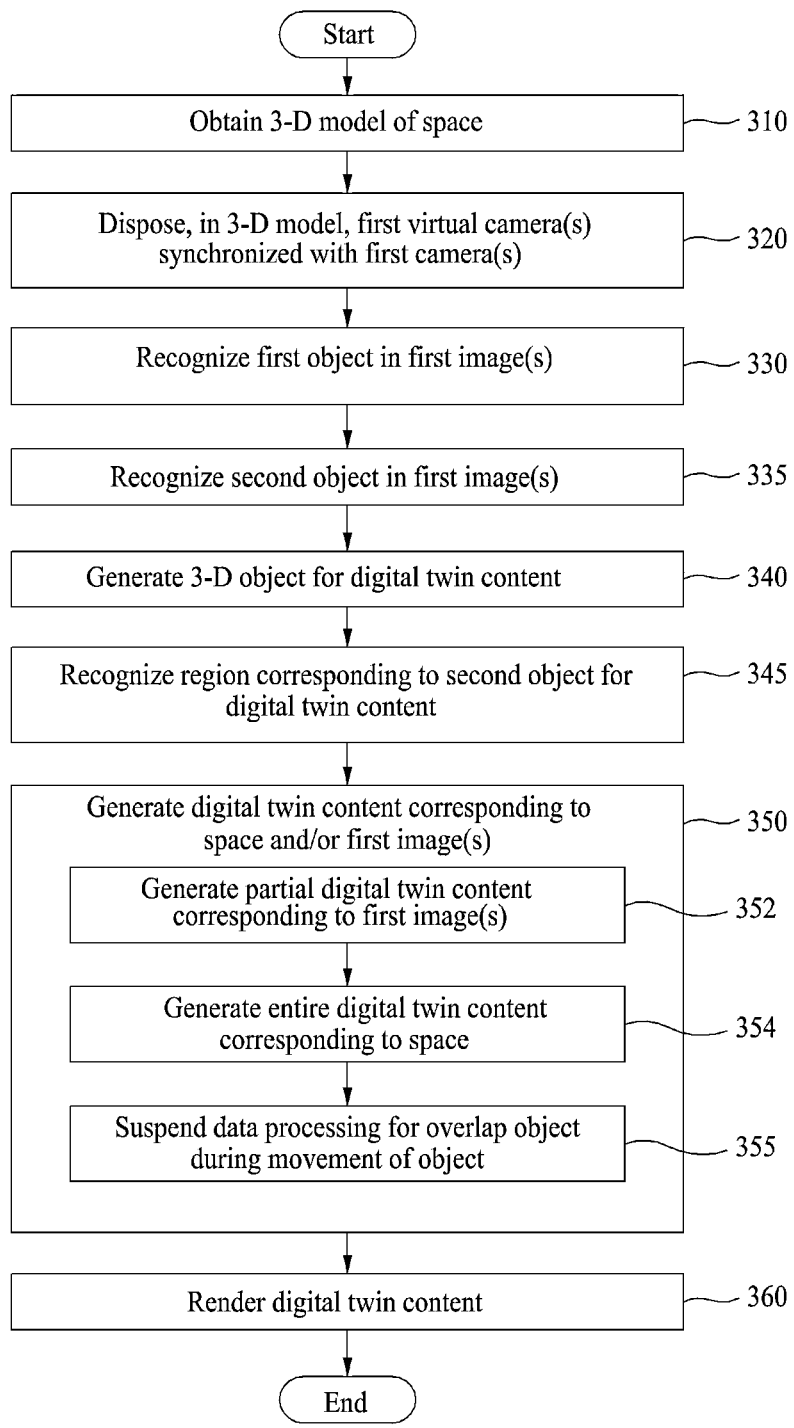
FIG. 3 is a flowchart illustrating a method of generating digital twin content corresponding to a space, by recognizing an object in an image of a space from a camera and generating a 3-D object corresponding to the recognized object by using a virtual camera that is synchronized with the camera in the space, according to an embodiment.

The description of the aforementioned technical characteristics described above with reference to FIGS. 1 and 2 may also be applied to FIG. 3 without any change, and thus a description thereof is omitted.

Figure 4:
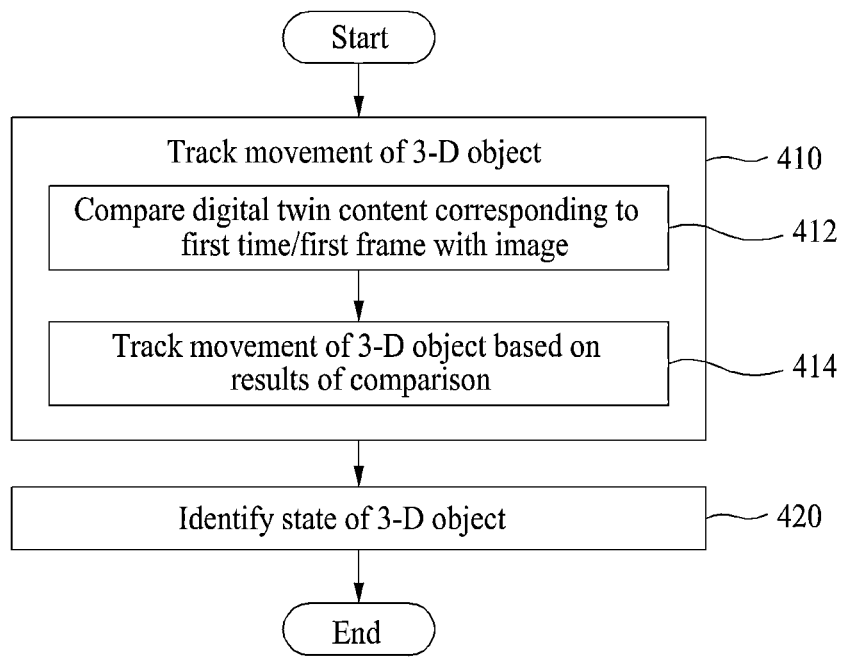
FIG. 4 is a flowchart illustrating a method of identifying the state of a 3-D object by checking a movement of the 3-D object in generating digital twin content corresponding to a space, according to an example.

FIG. 4 is a flowchart illustrating a method of identifying the state of a 3-D object by checking a movement of the 3-D object in generating digital twin content corresponding to a space, according to an example.

Steps 410 to 420 to be described later may belong to step 350 of generating the digital twin content 300, which has been described above with reference to FIG. 3.

In step 410, the computer system 100 may track the 3-D object 55 corresponding to the first object 10, that is, a work product within the space 1, for example. That is, a movement of the first object 10 may be incorporated into the 3-D object 55.

In step 420, the computer system 100 may identify the state of the 3-D object 55 based on the results of the track of the 3-D object 55. The state of the 3-D object 55 may indicate the state of the first object 10. In an embodiment, as an object within the space 1 can be individually tracked, the state of the object, such as a movement, a stop, or loading (or stack) can be identified. Furthermore, the state of the object, such as whether a process is performed in a proper sequence within the space 1, that is, a work site, or all of processes that are required for the object have been performed, may be identified.

For example, the computer system 100 may identify the state of the 3-D object 55 corresponding to the first object 10, such as any one of whether the 3-D object 55 enters the region corresponding to the second object (i.e., the standby region), whether the 3-D object 55 is disposed within the region corresponding to the second object, and whether the 3-D object 55 falls outside from the region corresponding to the second object. The computer system 100 may identify whether an object(s) or a 3-D object(s), that is, a work product within the region corresponding to the second object, has been stacked in the digital twin content 200 (or the digital twin content 60 or 50), based on the identified state. For example, when the second object is the place where a work product is stored or stacked, the computer system 100 may identify how many 3-D objects are stacked in the region corresponding to the second object by tracking a movement of a 3-D object corresponding to each object. As described above, the computer system 100 may count the number of 3-D objects disposed in the region corresponding to the second object, and may represent the number of 3-D objects counted in the form of graphics (or a 3-D object) within the digital twin content 200.

Figure 15:
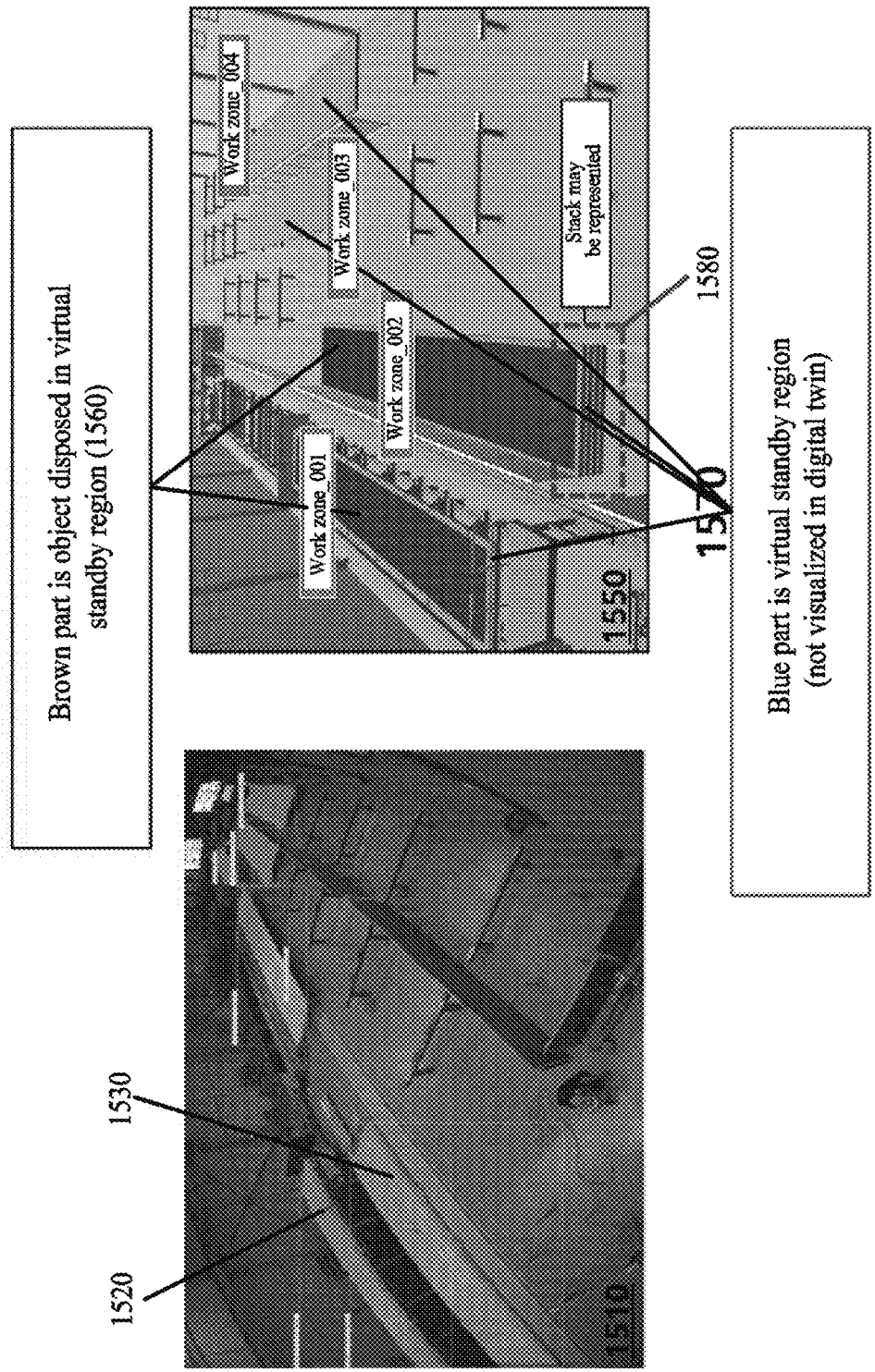
FIG. 15 illustrates a method of identifying an object in an image of a space and a standby region of the object and generating digital twin content that includes a 3-D object into which a movement of the object is incorporated and on which the state of the object (or the 3-D object) may be identified, according to an example.

FIG. 15 illustrates a method of generating digital twin content in which an object and the standby region of the object can be identified in an image of a space, which includes a 3-D object into which a movement of the object is incorporated, and in which the state of the object (or a 3-D object) may be identified, according to an example.

In the example illustrated in FIG. 15, each object is identified as having a quadrangle in a first image 1510 based on the instant segment algorithm. An under frame 001 may be named a first object 1520, that is, a work product. An under frame 002 may be named a second object 1530, that is, a standby region. Furthermore, digital twin content 1550 that is generated in accordance with the first image 1510 includes two first 3-D objects 1560 corresponding to the two first objects 1520 and 1530 and second 3-D objects 1570 corresponding to second objects indicative of standby regions at four places. The unit of an object that is identified in the first image 1510 may be named an under frame. Likewise, the unit of a corresponding 3-D object of the digital twin content 1550 may be named an under frame.

That is, the standby regions (i.e., the second objects) at the four places may be predefined in the first image 1510. The regions 1570 corresponding to the standby regions at the four places may be defined even in the digital twin content 1550 corresponding thereto. The regions 1570 may correspond to a work zone 001 to a work zone 004.

For example, in the illustrated embodiment, the region in which the first object 1520 is disposed and the region in which the first object 1530 is disposed may indicate the standby regions that have been previously designated. As a process is performed, the first object 1520 may be moved to a location where the first object 1530 is disposed and may overlap the first object 1530 (i.e., may be stacked on the first object 1530). Accordingly, the first 3-D object that is disposed in the work zone 001 corresponding to the standby space may be moved to the work zone 002 corresponding to another standby space. Accordingly, the first 3-D object that is disposed in the work zone 001 may be stacked on the first 3-D object disposed in the work zone 002.

The computer system 100 may count the number of first 3-D objects that is stacked in a region corresponding to each standby region (i.e., a second object) within the digital twin content 1550, and may represent (1580) the stack of the first 3-D objects within the digital twin content 1550 based on the counted number.

Accordingly, in an embodiment, "the number of stacks of a work production in each standby region" corresponding to a work situation within the space 1, which cannot be checked through the first image 1510, that is, a 2-D image, can be checked. Accordingly, according to an embodiment, a work situation or the state of a work product can be automatically identified by using the digital twin content 1550 without a need for a worker to manually identify a work situation or the state of a work product within the space 1.

In the digital twin content 1550 exemplified in FIG. 15, the regions 1570 corresponding to the standby regions have been visualized and indicated as blue quadrangles, for convenience of description, but may not be represented in digital twin content that is actually implemented.

Hereinafter, a method of tracking the 3-D object 55 corresponding to the first object 10, that is, a work product, within the space 1 in step 410 is described more specifically.

Figure 18:
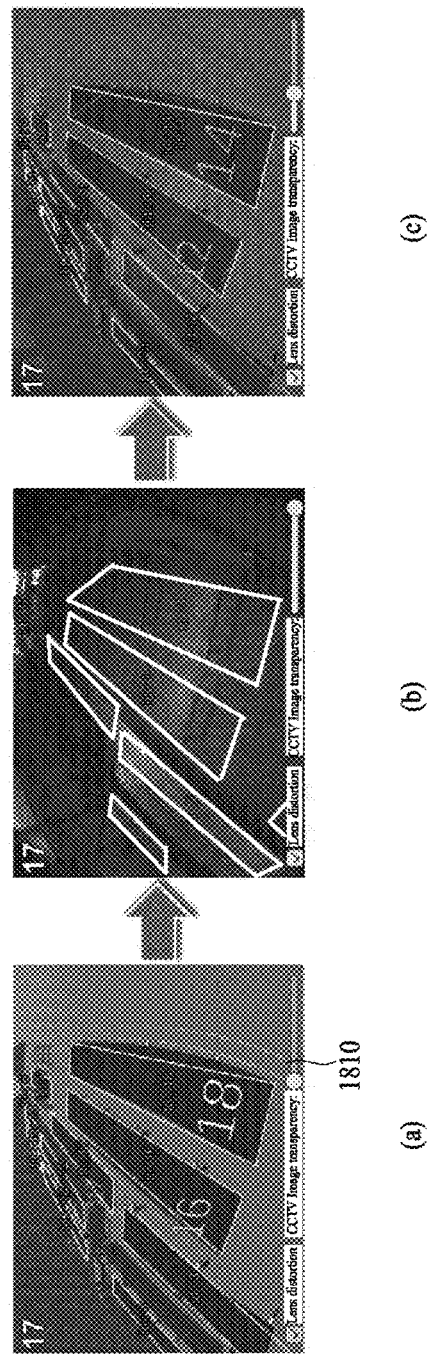
FIG. 18 illustrates a method of tracking a movement of a 3-D object included in digital twin content by incorporating a movement of an object within an image, according to an example.

FIG. 18 illustrates a method of tracking a movement of a 3-D object included in digital twin content by incorporating a movement of an object within an image, according to an example.

In tracking a movement of the 3-D object 55 into which a movement of the first object 10 is incorporated, the computer system 100 may compare a first region of a 3-D object corresponding to a first object within digital twin content (refer to (a) in FIG. 18) corresponding to a first time or first frame of a first image with a second region of the first object within the first image (refer to (b) in FIG. 18) of a second frame next to a second time or a first frame after the first time in step 412. That is, the computer system 100 may compare the first region and the second region by projecting the first region (of a next time or a next frame) of the digital twin content in (a) in FIG. 18 onto the second region of the first image in (b) in FIG. 18. In other words, as illustrated in (c) of FIG. 18, the region (a yellow box (i.e., boxes in FIG. 18(a))) of a 3-D object in the digital twin content and the region (a red box (i.e., boxes in FIG. 18(b))) of an object in the first image may be compared.

In step 414, the computer system 100 may track a movement of the 3-D object 55 into which a movement of the first object 10 is incorporated, by determining the movement of the first object 10 from the first time to a second time or from the first frame to a second frame based on the results of the comparison in step 412. Accordingly, the computer system 100 may generate the 3-D object 55 into which a real-time movement of the first object 10 is incorporated, and may incorporate the 3-D object 55 into the digital twin content 200.

The example illustrated in (a) in FIG. 18 may be partial digital twin content corresponding to a first image of the No. 17 camera, that is, one of the first cameras disposed in the space 1. The partial digital twin content may further include a user interface 1810 for indicating the first image of the No. 17 camera. For example, when the user interface 1810 is adjusted to a right end, only the first image that is captured by the No. 17 camera may be displayed on a screen (refer to (b) in FIG. 18) instead of the partial digital twin content. In contrast, when the user interface 1810 is adjusted to a left end, only the partial digital twin content may be displayed on the screen (refer to (a) in FIG. 18). Alternatively, when the user interface 1810 is properly adjusted, the first image and the partial digital twin content may be overlapped and displayed (refer to (c) in FIG. 18). As described above, the partial digital twin content that is displayed on the user/manager terminal 210 may be controlled so that the partial digital twin content is displayed by overlapping the first image corresponding thereto or is solely displayed, according to a manager or user's choice.

The description of the aforementioned technical characteristics described above with reference to FIGS. 1 to 3 may also be applied to FIGS. 4, 15, and 18 without any change, and thus a description thereof is omitted.

FIG. 5 is a flowchart illustrating a method of generating a 3-D object based on an object that is recognized in an image of a space, according to an example.

Hereinafter, a method of generating the 3-D object 55 corresponding to the first object 10 that is recognized in the first image in step 340, which has been described above with reference to FIG. 3, is described more specifically.

As described above, the computer system 100 may use the instance segmentation algorithm as the image analysis algorithm based on AI in order to recognize the first object 10 in the first image, and may recognize the first object 10 in the first image based on the instance segmentation algorithm.

Figure 7:
FIG. 7 illustrates a method of recognizing an object in an image of a space by using an instance segmentation algorithm, according to an example.

FIG. 7 illustrates a method of recognizing an object in an image of a space by using the instance segmentation algorithm, according to an example.

As illustrated, the computer system 100 may recognize an object corresponding to an individual work product within the space 1, that is, a work environment, by using the instance segmentation algorithm. As illustrated, objects may be distinguished by using their colors or additional identifiers. Furthermore, as illustrated, the recognition of a object 710 may be performed by identifying a plurality of feature points.

As described above, a figure corresponding to an object may be determined (i.e., a figure indicative of a shape of the object is recognized) in the first image of the space 1 by using the instance segmentation algorithm.

In generating the 3-D object 55 corresponding to the first object 10 recognized in the first image, in step 510, the computer system 100 may extract a predetermined number of feature points from a figure indicative of a shape of the first object 10 recognized in the first image. In this case, the number of extracted feature points may be eight, for example. In step 520, the computer system 100 may generate a polygon corresponding to the first object recognized in the first image, based on the extracted feature points. The figure indicative of the shape of the first object 10 in step 510 may be approximated in the form of a polygon having the extracted feature points as its vertexes. For example, the polygon may be a figure having eight vertexes. In step 530, the computer system 100 may generate a two-dimensional (2-D) basic figure corresponding to the first object recognized in the first image by further approximating the polygon generated in step 520. The basic figure may be a polygon having vertexes smaller than those of the polygon, and may be a quadrangle, for example. In step 540, the computer system 100 may generate the 3-D object 55 based on the basic figure generated in step 530.

The computer system 100 may generate the 3-D object 55 from the figure (i.e., the first 2-D figure or the basic figure corresponding to the first object 10) indicative of the shape of the first object 10, as steps 542 to 546 are performed.

In step 542, the computer system 100 may obtain information on the size and location of the first 2-D figure (or 2-D basic figure) corresponding to the recognized first object 10.

In step 544, the computer system 100 may determine a location of the space 1 in the 3-D model onto which a second 2-D figure is to be projected with the same size at the same location as that is indicated by the information on the size and location, through the first virtual camera that is synchronized with the first camera.

In step 546, the computer system 100 may generate the 3-D object 55 based on the location determined in step 544.

As described above, the 3-D object 55 generated by using the first virtual camera that is synchronized with the first camera may accurately correspond to the first object 10 of the first image that is captured by the first camera. The 3-D object 55 may be a 3-D object that is required to project a 2-D object having the same location and size as a 2-D figure corresponding to the first object 10 indicated in the first image by using the first virtual camera. In other words, the 3-D object 55 may be a 3-D object to be disposed in the 3-D model in order to indicate the same object as the first object 10 in the first virtual image of the 3-D model, which is captured by the first virtual camera.

FIGS. 16 and 17 illustrate a method of generating a 3-D object based on an object that is recognized in an image of a space, according to an example.

(a) in FIG. 16 illustrates a first image of the space 1. A first object 1610 that is recognized in the first image may indicate the first object 10. As illustrated in (b) to (d) in FIG. 16, the computer system 100 may extract (refer to (b) in FIG. 16) a predetermined number of feature points (e.g., eight feature points, and each feature point is indicated by x) from a FIG. 1620 indicative of a shape of the first object 1610 that is recognized in the first image. The computer system 100 may generate (refer to (c) in FIG. 16) a polygon 1630 having the extracted feature points as vertexes by connecting the extracted feature points. Next, the computer system 100 may generate (refer to (d) in FIG. 16) a basic figure (e.g., a quadrangle) 1640 by further approximating the polygon 1630. The basic FIG. 1640 may be a base for generating a 3-D object corresponding to the first object 1610.

FIG. 17 illustrates a method of generating a 3-D object by using the generated basic FIG. 1640. A method of generating the 3-D object 55 according to steps 542 to 546 is described more specifically with reference to FIG. 17.

A 2-D FIG. 1710 may correspond to the basic FIG. 1640 that has been described with reference to FIG. 16. The 2-D FIG. 1710 may be a 2-D quadrangle. A 3-D object corresponding to the first object 1610 may be generated as the 2-D FIG. 1710 is projected onto a 3-D model by a virtual camera 1700. In this case, the virtual camera 1700 is a first virtual camera, and may be synchronized with a first camera that has captured the first image (e.g., (a) in FIG. 16) in which the first object 1610 has been recognized.

As illustrated, the computer system 100 may determine a location where the 2-D FIG. 1710 is to be indicated at the same size as that of the first image at a synchronized view angle of the first virtual camera 1700. The computer system 100 may generate an under frame 1720 for a 3-D object, which corresponds to the 2-D FIG. 1710, as an under frame corresponding to the 2-D FIG. 1710 at the determined location. The computer system 100 may generate the 3-D object corresponding to the under frame 1720 by applying a height from the bottom of the 3-D model to the under frame 1720. Accordingly, the 3-D object corresponding to the first object 1610 having a height value from the bottom may be generated.

Accordingly, in an embodiment, the 3-D object accurately corresponding to the 2-D first object 1610 that is recognized in the first image can be generated.

The description of the aforementioned technical characteristics described above with reference to FIGS. 1 to 4, 15, and 18 may also be applied to FIGS. 5, 7, 16, and 17 without any change, and thus a description thereof is omitted.

Figure 6:
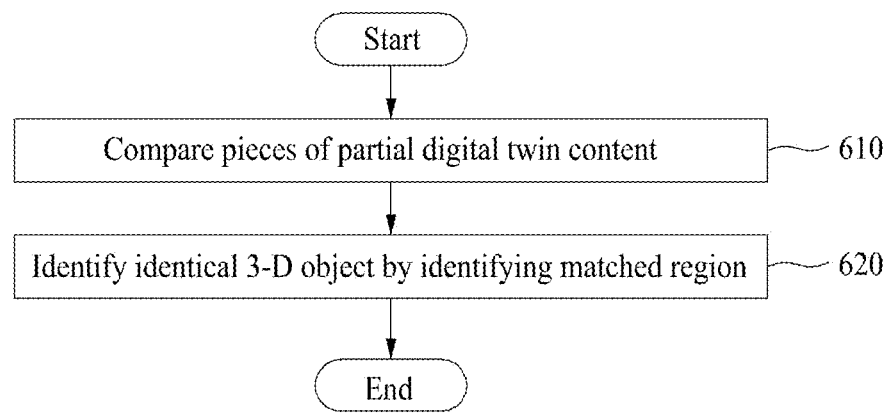
FIG. 6 is a flowchart illustrating a method of identifying the same 3-D object based on a comparison between pieces of partial digital twin content in generating digital twin content corresponding to a space, according to an example.

FIG. 6 is a flowchart illustrating a method of identifying the same 3-D object based on a comparison between pieces of partial digital twin content in generating digital twin content corresponding to a space, according to an example.

A method of identifying the 3-D object 55 corresponding to the same first object in pieces of partial digital twin content associated with different first virtual cameras is described more specifically with reference to FIG. 6.

Steps 610 and 620 in FIG. 6 may belong to step 350 of generating the digital twin content 300, which has been described above with reference to FIG. 3.

In step 610, the computer system 100 may compare pieces of partial digital twin content associated with the plurality of first virtual cameras (i.e., synchronized with the plurality of first cameras within the space 1).

In step 620, the computer system 100 may identify, as the same 3-D object, 3-D objects included in regions in which first partial digital twin content and second partial digital twin content are matched with each other, by identifying the regions (i.e., overlapped regions) in which the first partial digital twin content and the second partial digital twin content are matched with each other, among pieces of partial digital twin content. For example, the computer system 100 may identify whether the same region as a region including (at least some of) the 3-D object 55 corresponding to the first object included in the first partial digital twin content is present in the second partial digital twin content, by comparing the first partial digital twin content and the second partial digital twin content, and may determine the 3-D object that is present in the region identified in the second partial digital twin content to be matched with the 3-D object 55. In other words, the computer system 100 may identify the same 3-D object by comparing pieces of partial digital twin content associated with different virtual cameras. When the same 3-D object is identified in the pieces of partial digital twin content, the computer system 100 may generate the entire digital twin content 50 based on the pieces of partial digital twin content.

Figure 19:
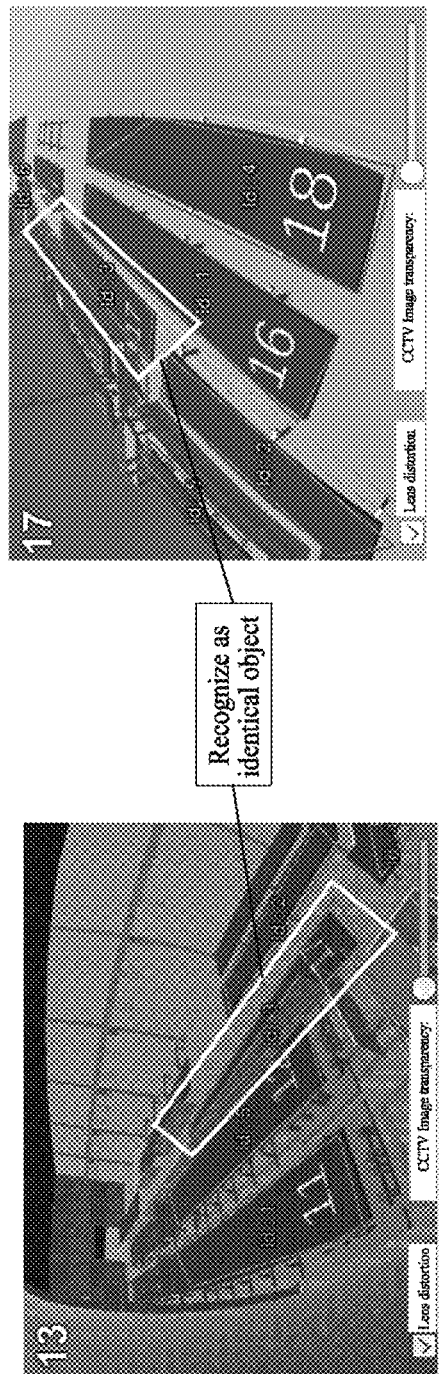
FIG. 19 illustrates a method of identifying the same 3-D object based on a comparison between pieces of partial digital twin content, according to an example.

FIG. 19 illustrates a method of identifying the same 3-D object based on a comparison between pieces of partial digital twin content, according to an example.

In the example illustrated in FIG. 19, a left figure illustrates partial digital twin content (hereinafter "first partial digital twin content") corresponding to a first image that is captured by a No. 13 camera, that is, the first camera within the space 1, and a right figure illustrates partial digital twin content (hereinafter "second partial digital twin content") corresponding to a first image that is captured by a No. 17 camera, that is, the first camera within the space 1. The computer system 100 may identify, in the second partial digital twin content, the same 3-D object as a 3-D object (id 3) (i.e., a 3-D object corresponding to a No. 17 object) included in the first partial digital twin content, by comparing the first partial digital twin content and the second partial digital twin content. That is, the computer system 100 may identify the same 3-D object by comparing pieces of different partial digital twin content.

Alternatively, the computer system 100 may identify the same under frame for generating the same 3-D object by comparing pieces of intermediate generation content of pieces of different partial digital twin content in a process of generating partial digital twin content.

The computer system 100 may generate an under frame (hereinafter a "virtual under frame") (for generating a 3-D object) for each first virtual camera by processing the results of the detection of an under frame (corresponding to an object) for each first camera. The computer system 100 may determine an under frame to be identically treated, by determining whether virtual under frames that are generated through two or more virtual cameras overlap. A 3-D object that is generated based on the under frame to be identically treated may be treated and processed as the same 3-D object. Accordingly, as the 3-D object (e.g., virtual under frame) is moved, the 3-D object (e.g., virtual under frame) may be tracked through partial digital twin content that is associated with another virtual camera, even after the 3-D object disappears from partial digital twin content associated with one virtual camera. In this case, a virtual camera with which the partial digital twin content in which the 3-D object (e.g., virtual under frame) is indicated is associated may be considered as having a "camera initiative" for the tracking. If the same 3-D object (e.g., virtual under frame) is indicated in two or more pieces of partial digital twin content, a corresponding 3-D object (e.g., a virtual under frame) may be indicated further at the center or/additionally a virtual camera that is associated with partial digital twin content indicative of more regions of a corresponding 3-D object (e.g., a virtual under frame) may have the camera initiative. Partial digital twin content associated with a virtual camera having the camera initiative may become main partial digital twin content for the tracking of a corresponding 3-D object (e.g., virtual under frame). A movement of the tracked 3-D object (e.g., virtual under frame) may be represented in the entire digital twin content 50.

Accordingly, in an embodiment, objects within the space 1 can be individually recognized and tracked. The digital twin content 200 including 3-D objects into which movements of the objects are incorporated may be generated.

The description of the aforementioned technical characteristics described above with reference to FIGS. 1 to 5, 7, and 15 to 18 may also be applied to FIGS. 6 and 19 without any change, and thus a description thereof is omitted.

FIG. 8 illustrates a method of disposing, in the 3-D model of a space, a virtual camera that is synchronized with a camera disposed in the space, according to an example.

In the example illustrated in FIG. 8, an image 810 that is captured by a camera disposed in the space 1 and a 3-D model 820 corresponding to the space 1 are represented.

A method of disposing a camera within the space 1 in the 3-D model 820 by synchronizing the camera with the 3-D model 820 is described with reference to FIG. 8.

Four points 1 to 4 that are disposed in the image 810 may be representative points that are designated within the image 810 that is captured by the camera within the space 1. The four points corresponding to the four representative points of the image 810 may also be disposed in the 3-D model 820 by using 3-D coordinates. The computer system 100 may synchronize a virtual camera with an (actual) camera that is disposed within the space 1, by adjusting the virtual camera so that the four points that are rendered by the virtual camera disposed in the 3-D model 820 are matched with the four representative points within the image 810.

A method of determining the location of a virtual camera, which enables two representative points 1 and 2, among the representative points 1 to 4 defined within the image 810 illustrated in FIG. 8, for example, to be matched, is described with reference to FIGS. 9 to 14A. A method of determining the location of a virtual camera, which enables the remaining two representative points 3 and 4, among the representative points 1 to 4 defined within the image 810 illustrated in FIG. 8, for example, to be matched, is described with reference to FIG. 14B. That is, a method of synchronizing the virtual camera with a camera within the space 1 so that the two representative points 1 and 2 are matched by adjusting the view angle and/or rotation of the virtual camera is described with reference to FIGS. 9 to 14A.

A method of determining the location of the virtual camera so that the remaining two representative points 3 and 4 are matched with as little error as possible by repeatedly adjusting the view angle and/or rotation of the virtual camera in FIGS. 9 to 14A while moving the location of the virtual camera within a predetermined range little by little is described with reference to FIG. 14B.

Accordingly, the virtual camera that is synchronized with the camera disposed within the space 1 may be disposed in the 3-D model 820.

FIG. 9 is a diagram illustrating a concept in which the location of a virtual camera is set within a virtual space that is imitated by using a digital twin scheme. In FIG. 9, a left figure (a) is a diagram illustrating a camera that captures a real space (e.g., the image 810), and a right figure (b) is a diagram illustrating a virtual camera installed in a virtual space (e.g., the 3-D model 820). The location of the camera installed in the real space may be accurately checked through actual measurement.

The computer system 100 installs a virtual camera 940 in a virtual space 930 that is imitated identically with a real space by using the digital twin scheme. In this case, the computer system 100 may determine the location of the virtual camera 940 so that the location of the virtual camera 940 corresponds to the location of a real camera 920 in a real space 910. Furthermore, the computer system 100 may determine the location of the virtual camera 940 so that the location of the virtual camera 940 is matched with the location of the real camera 920.

When determining that a location in the virtual space 930 and a location in the real space 910 are identical with each other so that the location of the virtual camera 940 corresponds to the location of the real camera 920, the computer system 100 may determine the view angle of the virtual camera 940 so that the view angle of the virtual camera 940 is identical with the view angle of the real camera 920.

Hereinafter, a method of determining the view angle of the virtual camera 940 is described more specifically with reference to FIGS. 10 to 13.

Figure 10:
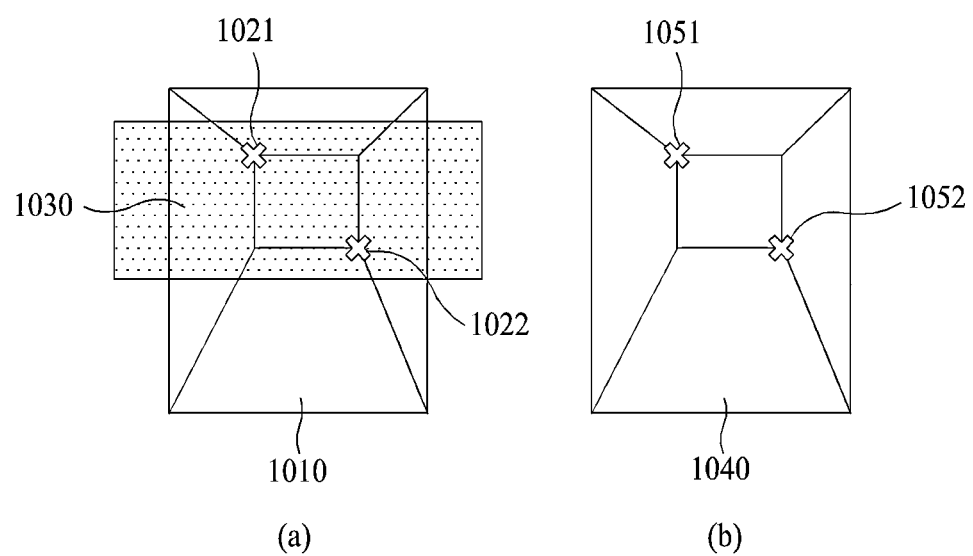

FIG. 10 is a diagram illustrating a concept in which a singular point is set within a virtual space (e.g., the 3-D model 820).

In FIG. 10, a left figure (a) illustrates a screen 1030 that is obtained by photographing a real space 1010. The computer system 100 may select singular points 1021 and 1022 in the screen 1030 of the real space 1010. According to an aspect, edge parts of the real space 1010 may be selected as the singular points 1021 and 1022 so that the singular points 1021 and 1022 can be easily selected by using several image processing schemes. The singular points 1021 and 1022 may correspond to the two representative points 1 and 2 that have been described above.

The computer system 100 may set, as virtual singular points 1051 and 1052, locations corresponding to the singular points 1021 and 1022 in a virtual space 1040, respectively. The computer system 100 may determine the view angle of a virtual camera so that a view angle when the virtual singular points 1051 and 1052 of the virtual space 1040, which correspond to the singular points 1021 and 1022 of the real space 1010, are photographed by using the virtual camera is identical with a view angle at which the singular points 1021 and 1022 are photographed in the real space 1010.

Figure 11:
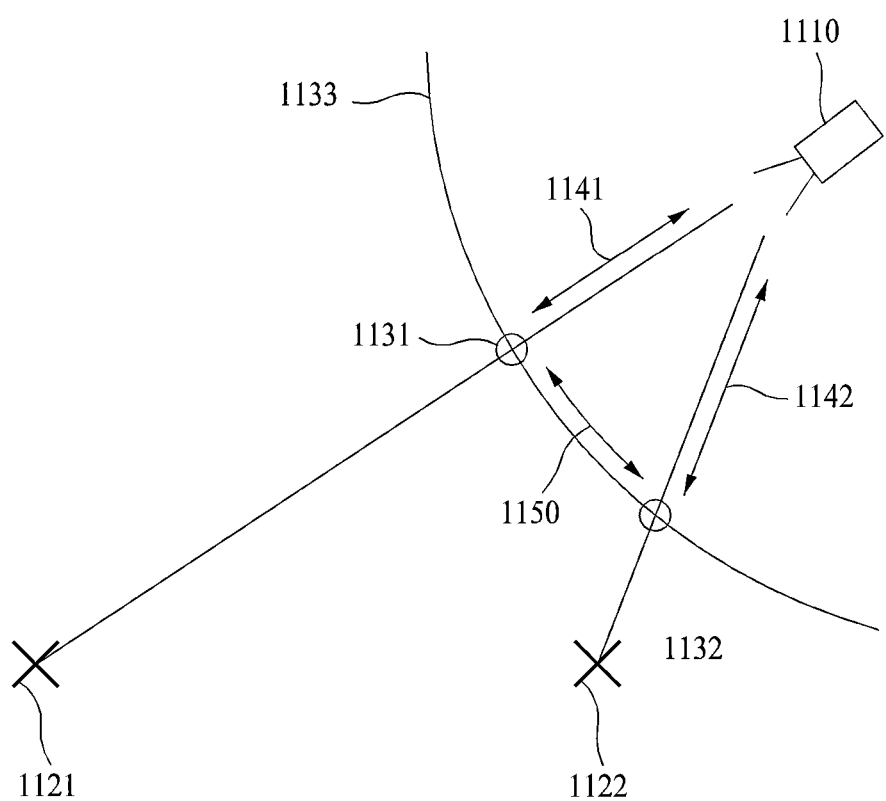
Figure 12:
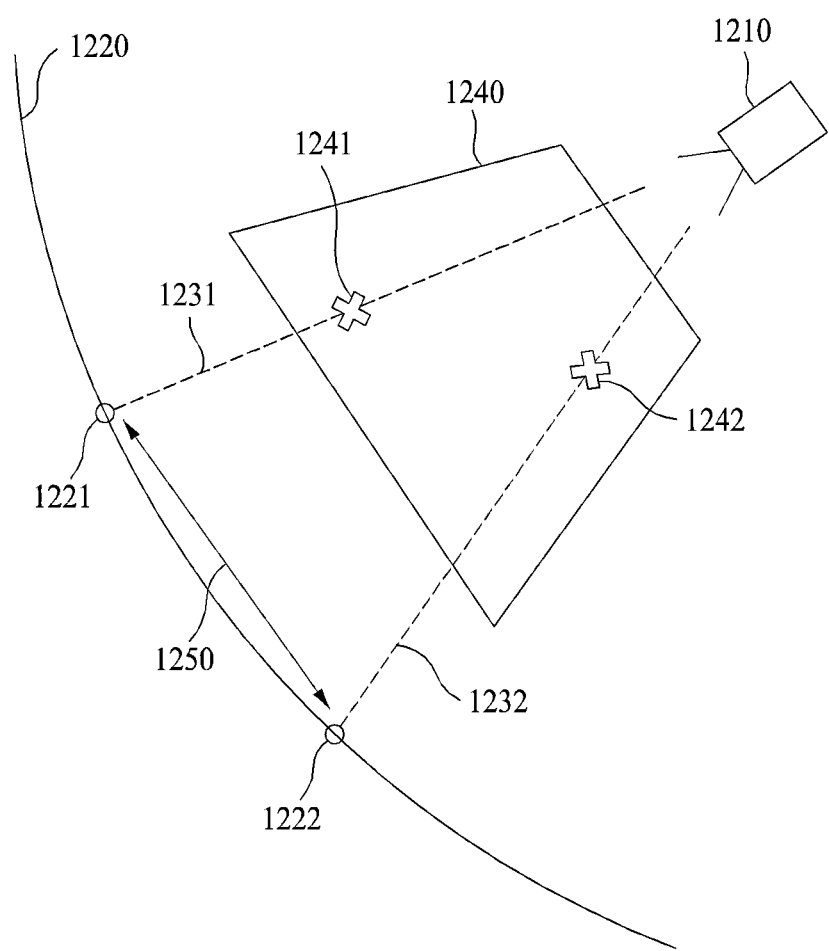
Figure 13:
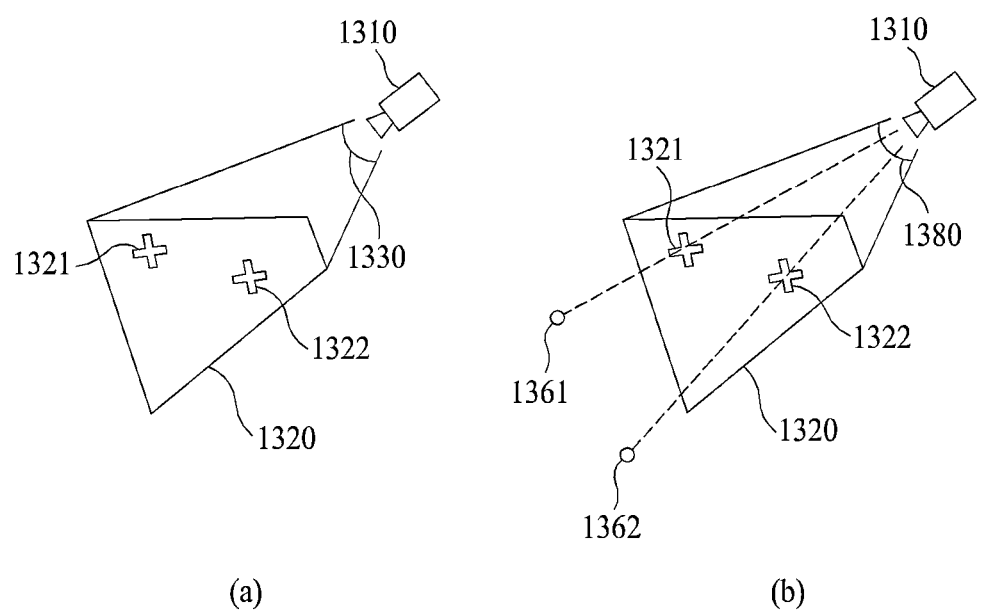

FIGS. 11 to 13 are diagrams illustrating a concept in which the view angle of a camera that captures an image and the view angle of a virtual camera within a virtual space are made to be identical with each other.

In FIG. 11, when a virtual camera 1110 captures virtual singular points 1121 and 1122 in a virtual space, the computer system 100 may calculate a distance 1150 between points 1133 that are far away from the virtual camera 1110 by reference distance 1141 and 1142, which have been pre-determined, and points 1131 and 1132 with which lines that connect the virtual camera 1110 and the virtual singular points 1121 and 1122 are intersected.

In FIG. 12, the computer system 100 may let coordinates corresponding to a singular point in a real space to correspond to a virtual screen region 1240 that is obtained by photographing a virtual space through a virtual camera 1210.

In this case, when straight lines 1231 and 1232 that pass coordinates 1241 and 1242 indicated in the virtual screen region 1240 are extended from the virtual camera 1210, the straight lines may reach coordinates (not illustrated) corresponding to the singular point in the real space.

The computer system 100 may calculate a distance 1250 between two points 1221 and 1222 by a reference distance that has been pre-determined from the virtual camera 1210, with respect to the straight lines 1231 and 1232 that are connected to the coordinates corresponding to the singular point in the real space from the virtual camera 1210.

In FIG. 13, the computer system 100 may determine the view angle of a virtual camera 1310 so that a view angle 1330 that is obtained by photographing a virtual space through the virtual camera 1310 is matched with the view angle of a screen 1320 that is obtained by photographing the virtual space, by adjusting the view angle 1330.

In this case, (a) in FIG. 13 may illustrate the view angle 1330 that is obtained by photographing the virtual space through the virtual camera 1310, an image and the screen 1320 that are obtained by photographing the virtual space, and virtual singular points 1321 and 1322 that are indicated in the image and the screen. Referring to (b) in FIG. 13, straight lines that connect the virtual camera 1310 and the virtual singular points 1321 and 1322 that are indicated in the image and the screen 1320 may reach coordinates (not illustrated) corresponding to singular points in a real space. The computer system 100 may determine a view angle 1380 of the virtual camera so that a distance between two points 1361 and 1362 that are far away from the virtual camera 1310 by reference distances that have been pre-determined in the straight lines is identical with a distance in the virtual space, and may let the view angle of a real camera and the view angle of the virtual camera 1310 to be matched with each other.

According to an embodiment, although a real camera and a virtual camera are directed in the same direction, the real camera or the virtual camera may be slantly installed. In this case, a screen photographed by using the virtual camera may be changed identically with a screen photographed by using the real camera by rotating the screen photographed by using the virtual camera.

Figure 14A:
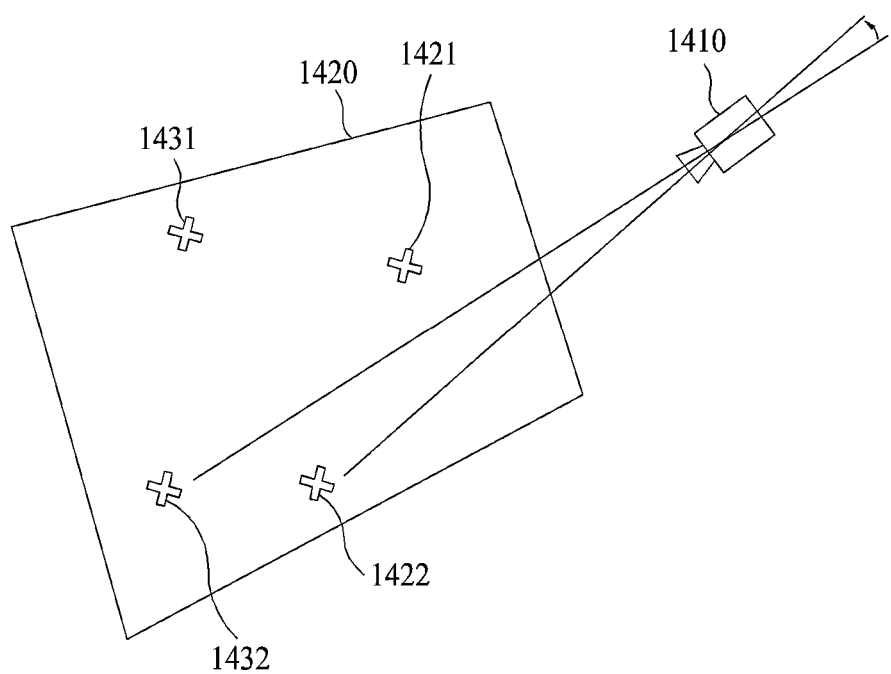
FIG. 14A and FIG. 14B illustrate a method of synchronizing a camera disposed in a space and a virtual camera disposed in a 3-D model, according to an example.

FIG. 14A is a diagram illustrating a concept in which the direction of a camera within a virtual space is made to be matched with the direction of a camera that captures an image.

In FIG. 14A, the computer system 100 may rotate a screen 1420 that is photographed by using a virtual camera 1410 so that the screen 1420 that is photographed by using the virtual camera 1410 becomes identical with a screen that is photographed by using a real camera.

Virtual image singular points 1431 and 1432 onto which virtual singular points have been projected are indicated in the image 1420 photographed by using the virtual camera

1410. The virtual image singular points 1431 and 1432 may be different from image singular points 1421 and 1422 at which real singular points are indicated, in an image that is photographed by the real camera. In this case, the computer system 100 may select the virtual image singular point 1431 and the image singular point 1421 that correspond to the same singular point, and may rotate an image that is photographed by using the virtual camera 1410 so that the virtual image singular point 1431 is matched with the image singular point 1421.

Figure 14B:
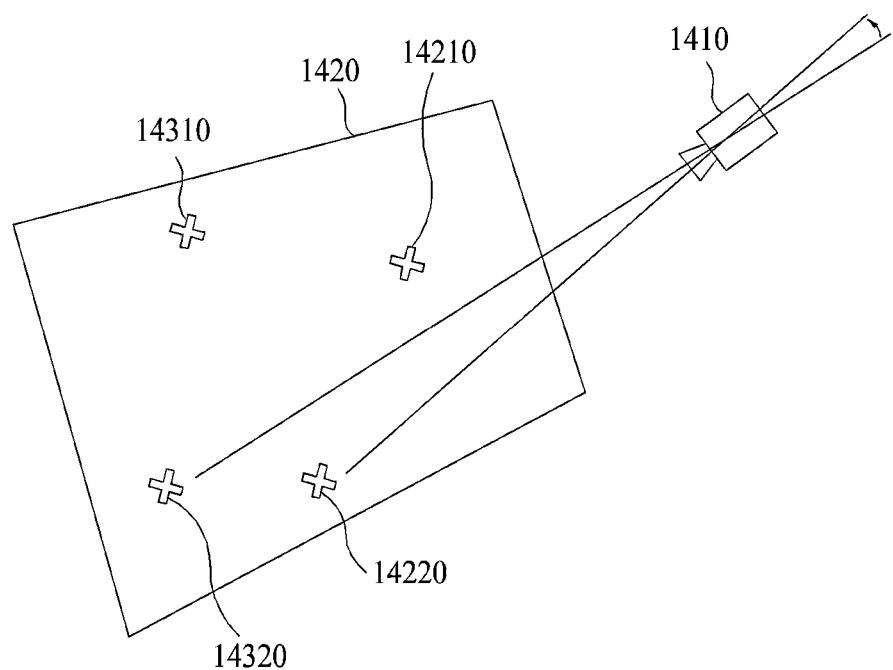

FIG. 14B illustrates four points 14210, 14220, 14310, and 14320 within the image 1420 that is photographed by using the virtual camera 1410, which correspond to the representative points 1 to 4 within the image 810 described with reference to FIG. 8. The computer system 100 may match the four points 14210, 14220, 14310, and 14320 and the representative points 1 to 4 within the image 810 by moving the location of the virtual camera 1410. Locations (or locations each having an error minimized) of the four points 14210, 14220, 14310, and 14320, which are matched with the representative points 1 to 4 within the image 810 may be determined as the final location of the virtual camera 1410. The virtual camera 1410 may be synchronized with the camera within the space 1. The computer system 100 may repeatedly compare the virtual image 1420 and the image 810 that is captured by the camera, while moving the virtual camera 1410 little by little (or by a predetermined range) within a predetermined candidate region, and may determine a location within the candidate region, which enables the virtual image 1410 and the image 810 to be matched with each other (or enables the virtual image 1410 and the image 810 to have a conformity degree of a predetermined level or more), as a location within the 3-D model 820 at which the virtual camera 1420 will be disposed.

According to an embodiment, in order to determine a synchronized location of the virtual cameras 1410 by determining the points 14220 and 14320 matched with the remaining representative points 3 and 5 in the state in which the points 14210 and 14310 corresponding to the two representative points 1 and 2 have been matched with each other, the computer system 100 may repeatedly compare the virtual image 1420 and the image 810 captured by the camera, while moving the virtual camera 1410 little by little (or by a predetermined range) within a predetermined candidate region as described above. Accordingly, the computer system 100 may determine a location within the candidate region, which enables the virtual image 1410 and the image 810 to be matched with each other (or enables the virtual image 1410 and the image 810 to have a conformity degree of a predetermined level or more), as a location within the 3-D model 820 at which the virtual camera 1420 will be disposed.

The description of the aforementioned technical characteristics described above with reference to FIGS. 1 to 7 and 15 to 19 may also be applied to FIGS. 8 to 14 without any change, and thus a description thereof is omitted.

FIG. 20 illustrates a method of locking another 3-D object that overlaps a 3-D object when the 3-D object moves within digital twin content, according to an example. Referring back to FIG. 3, in step 355, in generating the digital twin content 200, the computer system 100 may suspend data processing for another 3-D object that overlaps a 3-D object corresponding to the first object 10.

Specifically, as in step 355, the computer system 100 may suspend data processing for another 3-D object that overlaps a 3-D object within the digital twin content 200 until the overlap with the 3-D object is solved, while the 3-D object corresponding to a movement of the first object 10 is moved by incorporating the movement of the first object 10. The recognition and/or tracking of another 3-D object that overlaps may be suspended until the overlap with a 3-D object that is being moved is solved.

In other words, while an under frame corresponding to the 3-D object that is being moved is moved, data processing for an under frame corresponding to another 3-D object that overlaps the under frame corresponding to the 3-D object that is being moved may be suspended. The under frame corresponding to the another 3-D object may be locked.

FIG. 20 illustrates an example in which a 3-D object 2010 corresponding to a 3-D object that is being moved is moved. The 3-D object 2010 may be moved over (a) to (c) of FIG. 20. In this case, the 3-D object 2010 may overlap another 3-D object(s) 2020. Such another 3-D object(s) 2020 may be locked, and thus data processing for the another 3-D object(s) 2020 may be suspended.

As described above, in an embodiment, by suspending data processing for the another 3-D object(s) 2020 that interferes with and overlaps (or covered by) the 3-D object 2010 that moves, a recognition error of the 3-D object 2010 attributable to the another 3-D object(s) 2020 that interferes with and overlaps the 3-D object 2010 can be reduced, and required resources in data processing for an implementation of digital twin content can be reduced.

In FIG. 20, the 3-D objects 2010 and 2020 have each been illustrated in a form, such as an image, for convenience of description, but may be 3-D objects in digital twin content.

To accurately dispose a virtual camera in a 3-D model by synchronizing the virtual camera with a first camera may not be easy, when considering that it is difficult to select an accurate location for the virtual camera, that a distortion problem is present in a camera screen, and that the 3-D model does not accurately incorporate the layout of the space 1. Such an error may appear as an amplified error in the digital twin content 200 that is generated as a result. For example, a difference between only some pixels in a view angle in a 2-D image may appear as a relatively great change in the location of an under frame in a 3-D model. According to an embodiment, by considering such a difference, the computer system 100 may implement the digital twin content 200 so that an approximate movement path of a moving object is indicated, but a 3-D object around a point at which the moving object starts to move and a point at which the movement of the moving object is stopped (i.e., a point at which the moving object arrives) is accurately represented, instead of representing all moving situations of a moving object as a 3-D object.

Furthermore, as described above, the computer system 100 may suspend data processing for another object that overlaps a movement of an object through locking processing. Furthermore, the computer system 100 may stop processing related to height data with respect to a stopped object (e.g., an under frame in a fixed state). Accordingly, the computer system 100 may manage an object (e.g., an under frame in the fixed state) that is stopped in a 3-D model, in a form such as a 2-D object.

The description of the aforementioned technical characteristics described above with reference to FIGS. 1 to 19 may also be applied to FIG. 20 without any change, and thus a description thereof is omitted.

FIG. 21 illustrates a method of displaying, on a user or manager terminal, a plurality of pieces of partial digital twin content and the entire digital twin content by rendering the plurality of pieces of partial digital twin content and the entire digital twin content, according to an example.

The computer system 100 may render the digital twin content 200 in order to display the digital twin content 200 on the user/manager terminal 210. For example, the computer system 100 may render the partial digital twin content 60 and the entire digital twin content 50 in order to display the partial digital twin content 60 and the entire digital twin content 50 on the user/manager terminal 210.

Digital twin content illustrated in FIG. 21 illustrates an example of the digital twin content 200 that is displayed on the user/manager terminal 210.

As illustrated in FIG. 21, the digital twin content 200 may include a set 2110 of pieces of partial digital twin content and the entire digital twin content 2120.

The set 2110 of pieces of partial digital twin content may include pieces of partial digital twin content that are associated with first virtual cameras (Nos. 11 to 18 virtual cameras), respectively. The entire digital twin content 2120 is generated based on the pieces of partial digital twin content, and may display a 3-D model for the entire layout of the space 1.

The pieces of partial digital twin content (i.e., the set 2110 of pieces of partial digital twin content) and the entire digital twin content 2120 may be associated and displayed on the user/manager terminal 210. That is, a 3-D object 2130 that moves may be identically represented in the entire digital twin content 2120 and partial digital twin content including the 3-D object 2130 that moves.

At least one of i) that a 3-D object is differently displayed for each object, ii) that the 3-D object 2130 that moves is displayed differently from another 3-D object that has been stopped, iii) that a 3-D object that overlaps the 3-D object 2130 that moves is displayed differently from the remaining 3-D objects, iv) that the partial digital twin content is differently displayed for each first virtual camera, and v) that an indicator indicative of the first virtual camera or partial digital twin content, among pieces of partial digital twin content associated with the plurality of first virtual cameras, which is used for the tracking of the 3-D object 2130, is displayed in the 3-D object 2130 may be performed in at least one of the partial digital twin content and the entire digital twin content 2120.

Hereinafter, each of i) to v) is described more specifically.

In relation to i), a 3-D object corresponding to each object in the partial digital twin content and/or the entire digital twin content 2120 may be differently represented.

For example, as illustrated in FIG. 21, 3-D objects may be differently displayed as numbers 1 to 17, respectively. Each 3-D object may be associated with each identifier and may be individually tracked.

In relation to ii), in the partial digital twin content and/or the entire digital twin content 2120, the 3-D object 2130 that moves may be displayed differently from another 3-D object that has been stopped. For example, the 3-D object 2130 that moves may be displayed to have a color different from that of another 3-D object that has been stopped. For example, another 3-D object that has been stopped may be displayed to have a first color, and the 3-D object 2130 that moves may be displayed to have a second color. Accordingly, the 3-D object 2130 that moves may be clearly different from the another 3-D object that has been stopped.

In relation to iii), in the partial digital twin content and/or the entire digital twin content 2120, a 3-D object that overlaps the 3-D object 2130 that moves may be displayed differently from the remaining 3-D objects. For example, a 3-D object that overlaps the 3-D object 2130 that moves may be displayed to have a third color. The 3-D object that is displayed to have the third color may indicate a 3-D object that is associated with an under frame on which the locking processing has been performed.

In relation to iv), in the set 2110 of pieces of partial digital twin content, piece of partial digital twin content may be differently displayed. As illustrated in FIG. 21, the number (i.e., any one of 11 to 18) of the first virtual camera, which is associated with each piece of partial digital twin content, may be displayed in each piece of partial digital twin content. Alternatively/additionally, a different contour line 2140 may be displayed in each piece of partial digital twin content. The contour line 2140 may have a color and/or a pattern that is different for each piece of partial digital twin content.

In relation to v), in the partial digital twin content and/or the entire digital twin content 2120, an indicator indicative of the first virtual camera or partial digital twin content, among pieces of partial digital twin content associated with a plurality of first virtual cameras, which is used for the tracking of the 3-D object 2130 that moves, may be displayed in the 3-D object 2130 that moves. The indicator may indicate a first virtual camera having the "camera initiative" or partial digital twin content associated with the first virtual camera in the tracking of the 3-D object 2130. The indicator may represent the 3-D object 2130 in the same color as the contour line 2140. Alternatively, the indicator may indicate the identifier of the first virtual camera having the "camera initiative" or the partial digital twin content associated with the first virtual camera in association with the 3-D object 2130 that moves. The indicator may be displayed for only a predetermined time from the time when the 3-D object 2130 starts to move or only when the 3-D object 2130 moves by less than a predetermined distance. Furthermore, the indicator may be displayed when the "camera initiative" is changed into another first virtual camera, for a predetermined time, or when the 3-D object 2130 moves by less than a predetermined distance after the change, in the tracking of the 3-D object 2130.

In relation to the "camera initiative", a virtual camera with which partial digital twin content in which the 3-D object (e.g., virtual under frame) 2130 is displayed is associated may be considered as having the camera initiative for tracking. If the same 3-D object (e.g., virtual under frame) 2130 is displayed in two or more pieces of partial digital twin content, the 3-D object (e.g., virtual under frame) 2130 may be displayed further at the center or/additionally a virtual camera associated with partial digital twin content that indicates a greater region of the 3-D object (e.g., virtual under frame) 2130 may have the camera initiative. The partial digital twin content associated with the virtual camera having the camera initiative may become main partial digital twin content for the tracking of the 3-D object (e.g., virtual under frame) 2130.

As described above with reference to FIG. 21, according to an embodiment, a manager or a user can intuitively perceive the 3-D object 2130 that moves based on the set 2110 of pieces of partial digital twin content and the entire digital twin content 2120 that is displayed on the terminal 210, and can effectively obtain related information.

The description of the aforementioned technical characteristics described above with reference to FIGS. 1 to 20 may also be applied to FIG. 21 without any change, and thus a description thereof is omitted.

The aforementioned device may be implemented as a hardware component, a software component, and/or a combination of a hardware component and a software component. For example, the device and component described in the embodiments may be implemented by using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, component, physical device, virtual machine, or computer storage medium or device, or a transmitted signal wave permanently or temporarily, in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means, and may be stored in a computer-readable medium. The computer-readable recording medium may include a program instruction, a data file, and a data structure alone or in combination. The program instruction recorded on the medium may be specially designed and constructed for an embodiment, or may be known and available to those skilled in the computer software field. Examples of the computer-readable recording medium include magnetic media such as a hard disk, a floppy disk, and a magnetic tape, optical media such as CD-ROM and a DVD, magneto-optical media such as a floptical disk, and hardware devices specially configured to store and execute a program instruction, such as ROM, RAM, and flash memory. Examples of the program instruction include not only machine language code produced by a compiler, but a high-level language code which may be executed by a computer using an interpreter, etc. The hardware device may be configured to operate as one or more software modules in order to perform an operation according to an embodiment, and vice versa.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

The embodiments of the disclosure in which an exclusive property or privilege is claimed are defined as follows:

1. A method of generating digital twin content corresponding to a space comprising objects, the method being performed by a computer system and comprising:
    obtaining a three-dimensional (3-D) model of the space;
    disposing, in the 3-D model, a first virtual camera that is synchronized with a first camera that is disposed in the space and that captures at least some of the space;
    recognizing at least one first object in a first image that is captured by the first camera;
    generating a 3-D object that is disposed in the 3-D model and that corresponds to the first object, based on the first object and the first virtual camera; and
    generating digital twin content corresponding to at least one of the space comprising a 3-D object into which a movement of the first object in the first image is incorporated and the first image,
    wherein the generating of the digital twin content comprises:
    while the 3-D object moves by incorporating the movement of the first object, suspending data processing for an under-frame corresponding to another 3-D object until an under-frame corresponding to the 3-D object is not overlapped with the under-frame corresponding to the other 3-D object by locking the under-frame corresponding to the other 3-D object that overlaps the under-frame corresponding to the 3-D object within the digital twin content; and
    representing the 3-D object being moved and the other 3-D object corresponding to the locked under-frame with distinguishable colors on the digital twin content.

2. The method of claim 1, wherein:
    the first camera is plural,
    the disposing of the first virtual camera comprises disposing, in the 3-D model, a plurality of first virtual cameras that is synchronized with a plurality of first cameras, respectively,
    the recognizing of the at least one first object comprises recognizing the first object in the first image that is captured by each of the first cameras, and
    the generating of the digital twin content comprises:
    generating partial digital twin content corresponding to each of the first images in association with each of the first virtual cameras, wherein the partial digital twin content comprises a 3-D object into which the movement of the first object recognized in each of the first images within each of the first images is incorporated; and
    generating the entire digital twin content corresponding to the space, wherein the entire digital twin content comprises a 3-D object into which the movement of the first object within the space is incorporated.

3. The method of claim 2, wherein the generating of the digital twin content comprises:
    comparing pieces of partial digital twin content associated with the plurality of first virtual cameras; and
    identifying a region in which first partial digital twin content and second partial digital twin content, among the pieces of partial digital twin content, are matched with each other, and identifying, as an identical 3-D object, a 3-D object that is included in the region in which the first partial digital twin content and the second partial digital twin content are matched with each other.

4. The method of claim 2, further comprising rendering the partial digital twin content and the entire digital twin content in order to display the partial digital twin content and the entire digital twin content on a user terminal,
  wherein the partial digital twin content and the entire digital twin content are associated and displayed on the user terminal, and
  at least one of i) that a 3-D object is differently displayed for each object, ii) that a moving 3-D object is displayed differently from another 3-D object that has been stopped, iii) that the partial digital twin content is differently displayed for each first virtual camera, and iv) that an indicator indicative of the first virtual camera or the partial digital twin content, among pieces of partial digital twin content associated with a plurality of first virtual cameras, which is used to track a moving 3-D object, is displayed in the moving 3-D object, is performed in at least one of the partial digital twin content and the entire digital twin content.

5. The method of claim 1, further comprising:
recognizing at least one second object in the first image; and
identifying a region corresponding to the second object in the 3-D model,
wherein the first object is a moving work product within the space,
the second object indicates a standby region in which the work product stands by, and
the generating of the digital twin content comprises:
tracking a movement of the 3-D object into which a movement of the work product is incorporated; and
identifying any one state of whether the 3-D object enters the region corresponding to the second object, whether the 3-D object is placed in the region corresponding to the second object, and whether the 3-D object falls outside from the region corresponding to the second object,
wherein the identifying comprises
counting a number of 3-D objects entering the region corresponding to the second object indicating the standby region by tracking the movement of the 3-D object;
wherein the generating of the digital twin content further comprises:
representing a graphic indicating stacking of the 3-D objects within the digital twin content based on the counted number of the 3-D objects.

6. The method of claim 5, wherein the generating of the digital twin content further comprises identifying whether the work product or the 3-D object in the region corresponding to the second object is stacked in the digital twin content, based on the identified state.

7. The method of claim 1, wherein:
the recognizing of the first object comprises recognizing the first object in the first image based on an instance segmentation algorithm, and
the generating of the 3-D object comprises:
extracting a predetermined number of feature points from a figure indicative of a shape of the first object recognized in the first image;
generating a polygon corresponding to the first object recognized in the first image, based on the feature points;
generating a basic figure corresponding to the first object recognized in the first image by approximating the polygon; and
generating the 3-D object based on the basic figure.

8. The method of claim 1, wherein the generating of the 3-D object comprises:
obtaining information on a size and location of a first two-dimensional (2-D) figure corresponding to the recognized first object;
determining a location in the 3-D model onto which a second 2-D figure is to be projected, in an identical size at an identical location that is indicated by the information on the size and location, through the first virtual camera synchronized with the first camera; and
generating the 3-D object based on the determined location.

9. The method of claim 1, wherein the generating of the digital twin content comprises:
in tracking a movement of the 3-D object into which the movement of the first object is incorporated,
comparing a first region of a 3-D object corresponding to the first object within the digital twin content corresponding to a first time or first frame of the first image, with a second region of the first object within the first image of a second time after the first time or a second frame next to the first frame; and
tracking the movement of the 3-D object into which the movement of the first object is incorporated, by determining the movement of the first object from the first time to the second time or from the first frame to the second frame based on results of the comparison.

* * * * *